United States Patent
Fox, Jr.

(10) Patent No.: US 9,789,968 B1
(45) Date of Patent: *Oct. 17, 2017

(54) RING RELEASE SYSTEMS AND METHODS

(71) Applicant: Roy L. Fox, Jr., Belleville, WV (US)

(72) Inventor: Roy L. Fox, Jr., Belleville, WV (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/613,423

(22) Filed: Jun. 5, 2017

Related U.S. Application Data

(63) Continuation of application No. 15/175,176, filed on Jun. 7, 2016, now Pat. No. 9,676,487.

(51) Int. Cl.
*B64D 17/38* (2006.01)

(52) U.S. Cl.
CPC ................... *B64D 17/38* (2013.01)

(58) Field of Classification Search
CPC ........ B64D 17/38; B64D 17/32; B64D 25/06; A62B 35/00; A62B 35/0006; A62B 35/0018; A62B 35/04; Y10T 24/4005; Y10T 24/44299; Y10T 24/4453; Y10T 24/4501; Y10T 24/45482; Y10T 24/45785
See application file for complete search history.

(56) References Cited

U.S. PATENT DOCUMENTS

| | | | | |
|---|---|---|---|---|
| 1,920,408 A * | 8/1933 | Lafayette | ............... | B64D 17/30 24/654 |
| 2,016,236 A * | 10/1935 | Irvin | ..................... | B64D 17/30 24/599.6 |
| 2,327,359 A * | 8/1943 | Manson | .................... | B64D 1/02 206/317 |
| 2,481,116 A * | 9/1949 | Horning | .................. | B64D 17/38 24/573.11 |
| 2,517,488 A * | 8/1950 | Horning | .................. | B64D 17/34 244/152 |
| 2,605,065 A * | 7/1952 | Wilkins | .................. | B64D 10/00 244/122 B |
| 2,710,999 A * | 6/1955 | Davis | .................. | A44B 11/2526 24/197 |
| 2,801,062 A * | 7/1957 | Leahy | .................... | B64D 17/62 244/137.2 |
| 2,802,252 A * | 8/1957 | Gaylord | ............. | A44B 11/2519 24/600.4 |
| 2,823,881 A * | 2/1958 | Patterson | ............... | B64D 17/00 244/113 |

(Continued)

OTHER PUBLICATIONS

Issue Notification dated May 24, 2017 in U.S. Appl. No. 15/175,176.

(Continued)

*Primary Examiner* — Medhat Badawi
(74) *Attorney, Agent, or Firm* — Snell & Wilmer L.L.P.

(57) ABSTRACT

A ring release system is configured to releasably couple a parachute to a payload. The ring release system may comprise an upper release ring, an intermediate release ring with a partially and/or completely flattened end, and a lower release ring having a J-shape. When activated, the release rings cascadingly separate to release the parachute from the payload. With these systems and related methods, larger payloads may be supported, the mass and size of the ring release system may be reduced as compared to prior systems, and various failure modes may be eliminated.

18 Claims, 27 Drawing Sheets

(56) References Cited

U.S. PATENT DOCUMENTS

| | | | | |
|---|---|---|---|---|
| 2,889,168 A * | 6/1959 | Engelhardt | B64D 17/383 | 24/573.11 |
| 2,986,362 A * | 5/1961 | Gimalouski | B64D 17/32 | 24/632 |
| 3,016,218 A * | 1/1962 | Sepp, Jr. | B64D 17/52 | 244/148 |
| 3,141,215 A * | 7/1964 | Turolla | B64D 17/38 | 24/654 |
| 3,142,462 A * | 7/1964 | Franz | B64D 17/52 | 244/148 |
| 3,154,272 A * | 10/1964 | Gold | B64D 17/30 | 244/151 R |
| 3,249,328 A * | 5/1966 | Knowles | B64D 17/38 | 24/602 |
| 3,279,012 A * | 10/1966 | Gold | B64D 17/30 | 24/200 |
| 3,419,236 A * | 12/1968 | Weber | A62B 1/14 | 182/5 |
| 3,437,295 A * | 4/1969 | Istel | B64D 17/52 | 244/148 |
| 3,498,565 A * | 3/1970 | Nash-Boulden | B64C 31/036 | 244/152 |
| 3,692,262 A * | 9/1972 | Gaylord | B64D 17/30 | 24/573.11 |
| 3,692,263 A * | 9/1972 | Pravaz | B64D 17/32 | 244/151 A |
| 3,765,627 A * | 10/1973 | Snyder | B64D 17/32 | 244/147 |
| 3,884,436 A * | 5/1975 | Poehlmann | B64D 25/06 | 24/312 |
| 3,934,848 A * | 1/1976 | Snyder | B64D 17/32 | 24/197 |
| 4,030,689 A * | 6/1977 | Rodriguez | B64D 17/38 | 24/306 |
| 4,090,683 A * | 5/1978 | Derrien | B64D 17/30 | 244/151 A |
| 4,262,865 A * | 4/1981 | Smith | B64D 17/38 | 244/147 |
| 4,337,913 A * | 7/1982 | Booth | B64D 17/38 | 24/573.11 |
| 4,428,102 A * | 1/1984 | Brownell | B64D 17/38 | 24/573.11 |
| 4,623,109 A * | 11/1986 | Sadeck | B64D 17/343 | 244/142 |
| 4,659,042 A * | 4/1987 | Friddle, II | B64D 17/00 | 244/142 |
| 4,746,084 A * | 5/1988 | Strong | B64D 17/30 | 224/159 |
| 4,793,575 A * | 12/1988 | Butler | B64D 17/50 | 244/148 |
| 4,923,150 A * | 5/1990 | Calkins | B64D 17/38 | 24/573.11 |
| 5,277,348 A * | 1/1994 | Reid | B64D 17/30 | 182/6 |
| 5,618,011 A * | 4/1997 | Sadeck | B64D 17/24 | 24/573.11 |
| 5,816,184 A * | 10/1998 | McCulloh | B63B 35/816 | 114/253 |
| 5,904,324 A * | 5/1999 | Di Bella | B64D 17/34 | 244/142 |
| 6,056,242 A * | 5/2000 | Collins | B64D 17/38 | 244/147 |
| 6,375,532 B1 * | 4/2002 | Eiband | B63C 9/08 | 441/84 |
| 6,393,672 B1 * | 5/2002 | Anscher | A45C 13/30 | 24/265 CD |
| 6,431,495 B1 * | 8/2002 | Lawyer | B64D 17/32 | 244/149 |
| 6,626,400 B1 * | 9/2003 | Booth | B64D 17/52 | 244/149 |
| D480,869 S * | 10/2003 | Mello | | D3/228 |
| 6,644,597 B1 * | 11/2003 | Bahniuk | B64D 17/38 | 244/142 |
| 6,942,185 B2 * | 9/2005 | Preston | B64D 17/38 | 244/151 B |
| 6,983,913 B2 | 1/2006 | Auvray | | |
| 7,264,205 B2 * | 9/2007 | Fox, Jr. | B64D 17/62 | 244/151 B |
| 7,699,268 B2 * | 4/2010 | Fox, Jr. | B64D 17/38 | 24/DIG. 36 |
| 7,753,410 B2 * | 7/2010 | Coultrup | B60R 22/30 | 24/182 |
| 7,930,808 B2 * | 4/2011 | Sadeck | B64D 17/38 | 24/265 R |
| 8,033,507 B2 * | 10/2011 | Fox, Jr. | B64D 17/383 | 244/151 B |
| 8,074,326 B2 * | 12/2011 | Slank | A01K 27/005 | 119/776 |
| 8,083,184 B2 * | 12/2011 | Fox, Jr. | B64D 1/08 | 244/137.3 |
| 8,096,509 B2 * | 1/2012 | Fox, Jr. | B64D 17/02 | 244/150 |
| 8,864,080 B2 * | 10/2014 | Fox, Jr. | B64D 1/12 | 108/51.11 |
| 8,979,031 B2 * | 3/2015 | Fox, Jr. | B64D 1/08 | 244/137.3 |
| 9,242,736 B2 | 1/2016 | Fitzgerald | | |
| 9,676,487 B1 * | 6/2017 | Fox, Jr. | B64D 17/38 | |
| 2004/0155153 A1 * | 8/2004 | Booth | B64D 17/38 | 244/149 |
| 2005/0001099 A1 * | 1/2005 | Auvray | B64D 17/38 | 244/151 A |
| 2005/0205356 A1 * | 9/2005 | Velasco | A62B 35/0037 | 182/3 |
| 2006/0145006 A1 * | 7/2006 | Drost | B64C 1/066 | 244/118.5 |
| 2006/0195962 A1 * | 9/2006 | Jordan | A41D 13/0007 | 2/69 |
| 2006/0273225 A1 * | 12/2006 | Bahniuk | B64D 17/38 | 244/151 R |
| 2008/0141921 A1 * | 6/2008 | Hinderks | B63B 1/28 | 114/274 |
| 2009/0026319 A1 * | 1/2009 | Strong | B64C 39/024 | 244/152 |
| 2009/0127395 A1 * | 5/2009 | Fradet | B64D 17/38 | 244/149 |
| 2009/0127396 A1 * | 5/2009 | Jordan | A62B 35/0018 | 244/151 R |
| 2009/0294594 A1 * | 12/2009 | Deazley | B64D 17/386 | 244/149 |
| 2010/0001140 A1 * | 1/2010 | McHugh | B64D 17/38 | 244/148 |
| 2010/0032526 A1 * | 2/2010 | Higgins | B64D 17/30 | 244/148 |
| 2010/0164258 A1 * | 7/2010 | McHugh | B64D 17/025 | 297/195.11 |
| 2011/0220765 A1 * | 9/2011 | Eric | B64D 17/52 | 244/148 |
| 2012/0025028 A1 * | 2/2012 | Suze | B64D 17/38 | 244/149 |
| 2012/0227389 A1 * | 9/2012 | Hinderks | F01B 1/10 | 60/317 |
| 2012/0291234 A1 * | 11/2012 | Berge | B64D 17/46 | 24/323 |
| 2013/0146713 A1 * | 6/2013 | Fitzgerald | B64D 17/38 | 244/151 B |
| 2013/0175399 A1 * | 7/2013 | Fitzgerald | B64D 17/38 | 244/151 B |
| 2014/0097299 A1 * | 4/2014 | Deazley | B64D 1/08 | 244/149 |
| 2015/0065317 A1 * | 3/2015 | Washington | A63B 21/0442 | 482/124 |
| 2015/0069186 A1 * | 3/2015 | Blignaut AKA Blikkies | B64D 17/30 | 244/151 A |

(56) References Cited

U.S. PATENT DOCUMENTS

2015/0202475 A1* 7/2015 Botti .................. A62B 35/0012
                                                      182/3
2016/0150360 A1* 5/2016 Pope ..................... B64D 17/00
                                                      340/8.1
2016/0346571 A1* 12/2016 Huber ............... A62B 35/0025

OTHER PUBLICATIONS

Notice of Allowance dated May 10, 2017 in U.S. Appl. No. 15/175,176.
Final Rejection dated Mar. 2, 2017 in U.S. Appl. No. 15/175,176.
Non-Final Rejection dated Nov. 2, 2016 in U.S. Appl. No. 15/175,176.

* cited by examiner

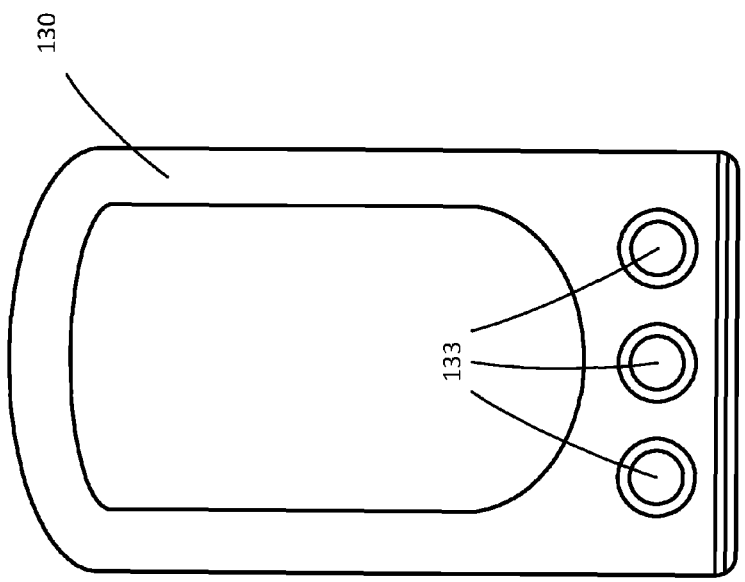
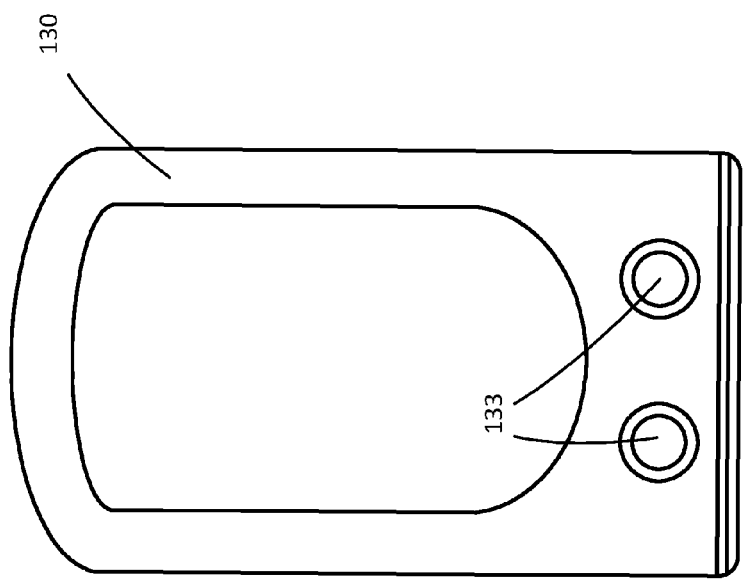
FIG. 2F
FIG. 2E

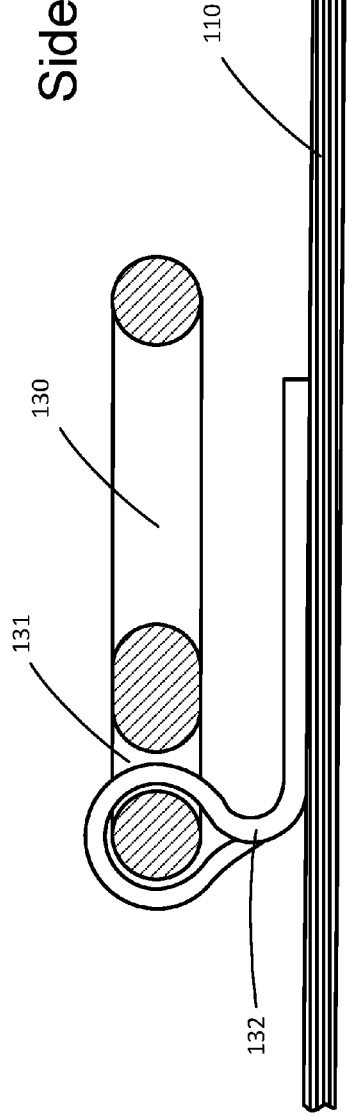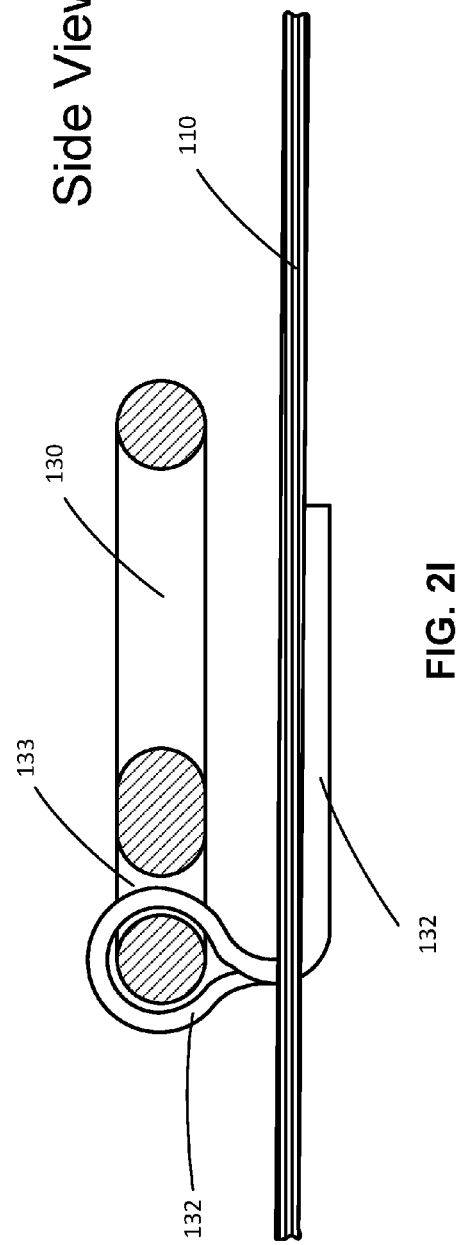

Side View

FIG. 4A  FIG. 4B

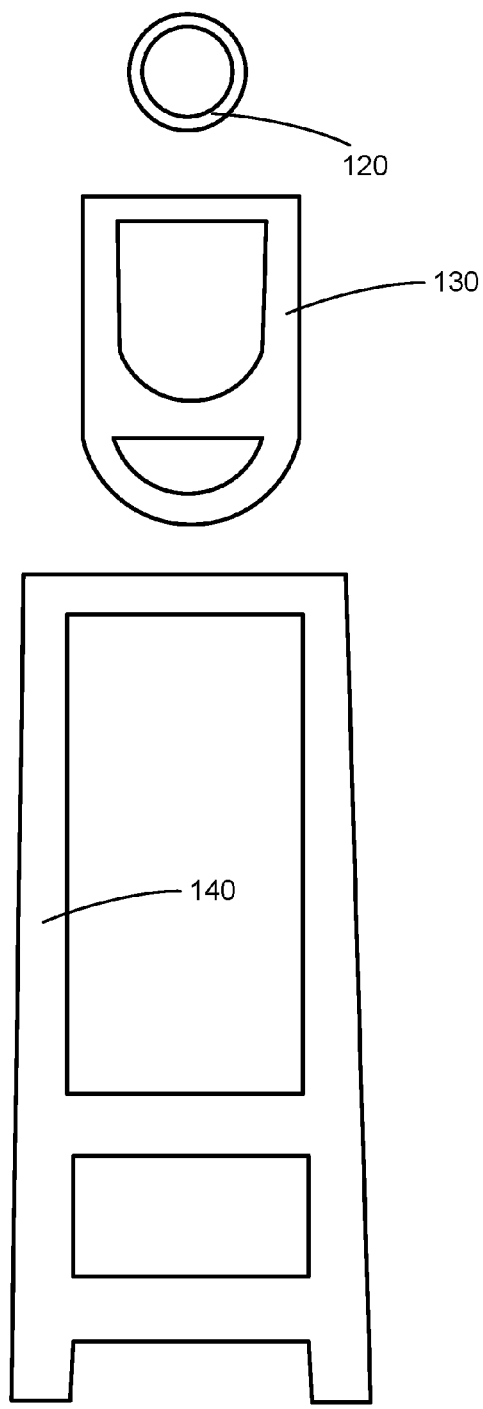
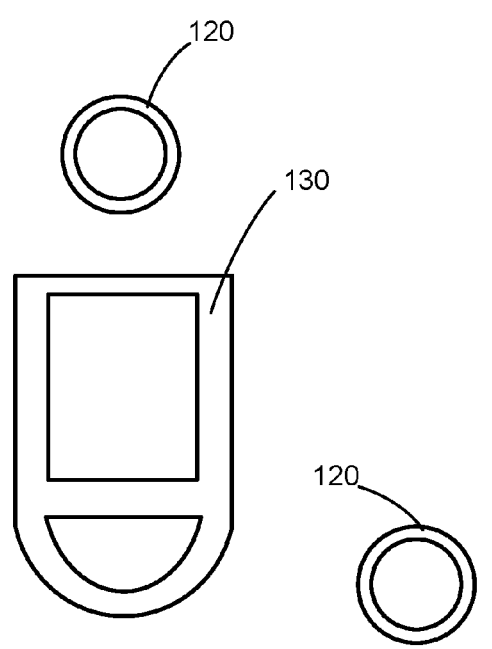
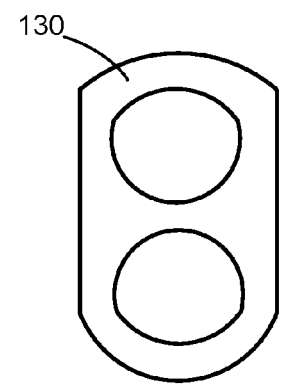
FIG. 7A
FIG. 7B
FIG. 7C

RING RELEASE SYSTEMS AND METHODS

CROSS REFERENCE TO RELATED APPLICATIONS

This application is a continuation of U.S. Ser. No. 15/175,176 filed on Jun. 7, 2016, now U.S. Pat. No. 9,676,487 entitled "RING RELEASE SYSTEMS AND METHODS". The entire contents of the foregoing application are hereby incorporated by reference for all purposes.

TECHNICAL FIELD

The present disclosure relates to ring-based release systems, and particularly to systems and methods for releasing parachutes from payloads.

BACKGROUND

When a personnel parachute malfunctions, a common recovery protocol is to release the failed chute from the parachutist and deploy a reserve chute. One prior release system utilized for this purpose is a 3-ring release system, for example as disclosed by Booth (U.S. Pat. No. 4,337,913) or Auvray (U.S. Pat. No. 6,983,913). However, these and other prior release systems suffer from various deficiencies. More generally, a variety of situations may arise where two coupled objects may desirably be released from one another. Accordingly, improved release systems and methods of use thereof are desirable.

SUMMARY

A ring release system and methods for use of the same are provided. In an exemplary embodiment, a ring release system comprises an upper release ring coupled to a riser via a first hinge, an intermediate release ring coupled to the riser via a second hinge, and a lower release ring coupled to a loop in the bottom of the riser. The upper release ring, intermediate release ring, and lower release ring are configured to cascadingly rotate with respect to the riser responsive to release of a retaining mechanism releasably coupled to the upper release ring, and an end of the intermediate release ring comprises an arc having a radius greater than 50% of the width of the intermediate release ring.

In another exemplary embodiment, a method for separating a parachute from a payload comprises coupling a parachute to a payload via a ring release system, deploying the payload from an aircraft, opening the parachute to slow the descent of the payload through the air, and operating the ring release system to separate the parachute from the payload. The ring release system comprises an upper release ring coupled to a riser via a first hinge, an intermediate release ring coupled to the riser via a second hinge, and a lower release ring coupled to a loop in the bottom of the riser. The upper release ring, intermediate release ring, and lower release ring are configured to cascadingly rotate with respect to the riser responsive to release of a retaining mechanism releasably coupled to the upper release ring, and an end of the intermediate release ring comprises an arc having a radius greater than 50% of the width of the intermediate release ring.

In another exemplary embodiment, a method for releasably coupling a parachute to a payload via a ring release system comprises passing a loop end of a suspension cord through an attachment point of the payload, passing the loop end of the suspension cord around a lower release ring, the other end of the suspension cord coupled to a riser, disposing the lower release ring against the riser to secure the suspension cord, passing an intermediate release ring through the lower release ring and disposing the intermediate release ring against the riser to secure the lower release ring, passing an upper release ring through the intermediate release ring and disposing the upper release ring against the riser to secure the intermediate release ring, and securing the upper release ring via a releasable mechanism.

In another exemplary embodiment, a ring release system comprises a riser comprising webbing, a first release ring coupled to the riser via a cord (the cord passing through the weave of the webbing comprising the riser and stitched to a side of the webbing opposite the first release ring), and a second release ring coupled to a loop in the bottom of the riser he first release ring and second release ring are configured to cascadingly rotate with respect to the riser responsive to release of a retaining mechanism releasably coupled to the first release ring.

The contents of this summary section are provided only as a simplified introduction to the disclosure, and are not intended to be used to limit the scope of the appended claims.

BRIEF DESCRIPTION OF THE DRAWINGS

With reference to the following description, appended claims, and accompanying drawings:

FIGS. 2E and 2F illustrate intermediate release rings configured with holes for interfacing with attachment cords in accordance with various exemplary embodiments;

FIG. 2H illustrates a side view of an intermediate release ring coupled via webbing to the front side of a riser assembly in accordance with an exemplary embodiment;

FIG. 2I illustrates a side view of an intermediate release ring coupled via cord to the back side of a riser assembly in accordance with various exemplary embodiments;

FIG. 4A illustrates operation of release rings of a prior art ring release system;

FIG. 4B illustrates operation of an exemplary intermediate release ring of a ring release system in accordance with various exemplary embodiments, showing improved mechanical advantage;

FIGS. 7A, 7B, and 7C illustrate configurations and interrelationships of components of a ring release system in accordance with various exemplary embodiments;

DETAILED DESCRIPTION

Figure 1A:
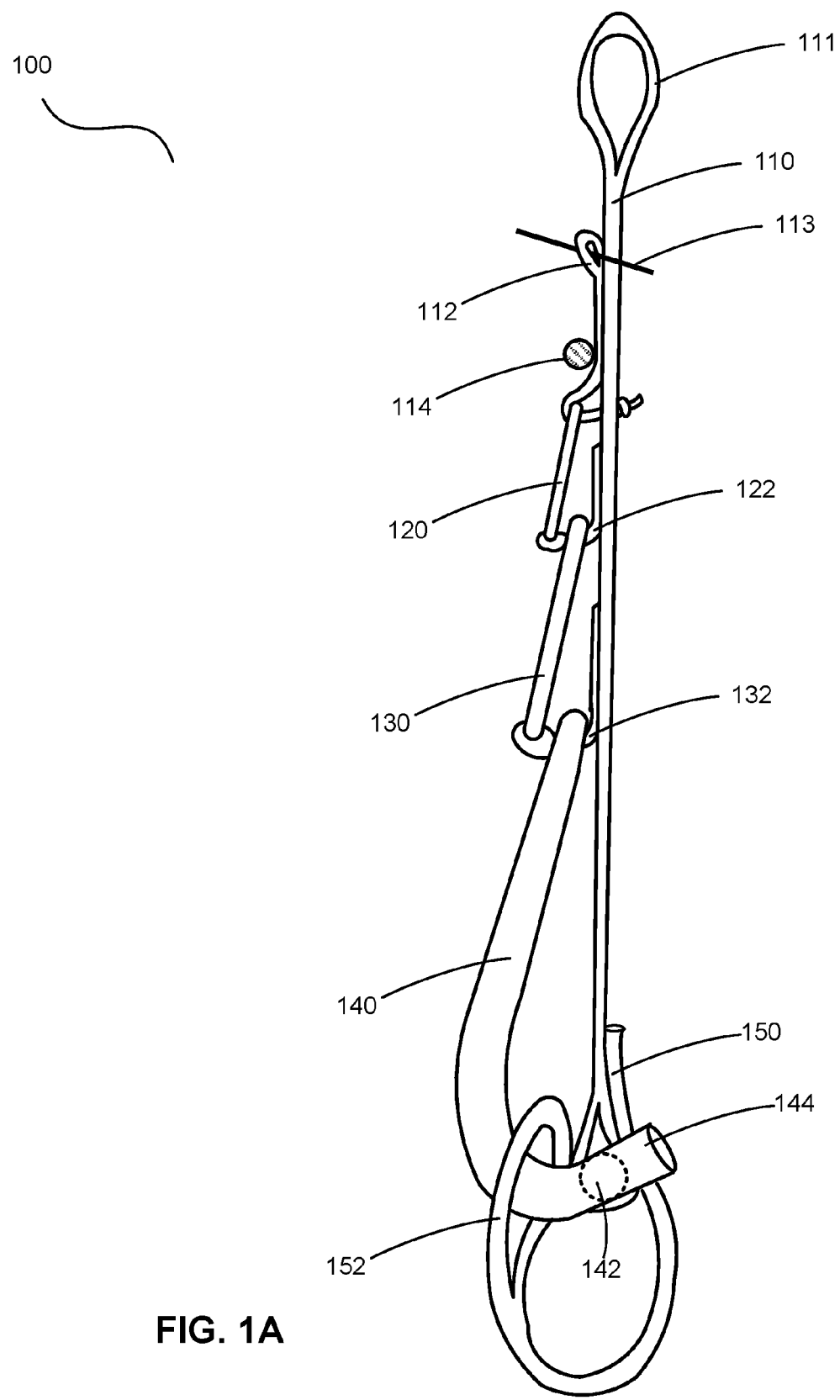
FIG. 1A illustrates a ring release system in accordance with an exemplary embodiment.

The following description is of various exemplary embodiments only, and is not intended to limit the scope, applicability or configuration of the present disclosure in any way. Rather, the following description is intended to provide a convenient illustration for implementing various embodiments including the best mode. As will become apparent, various changes may be made in the function and arrangement of the elements described in these embodiments without departing from the scope of the appended claims.

For the sake of brevity, conventional techniques for release systems, parachute construction, deployment, reefing, disreefing, release, recovery, and/or the like may not be described in detail herein. Furthermore, the connecting lines shown in various figures contained herein are intended to represent exemplary functional relationships and/or physical couplings between various elements. It should be noted that many alternative or additional functional relationships or physical connections may be present in a practical ring release system and/or related methods of use.

Prior approaches to a 3-ring style release device typically comprised a 2-ring series of rings acting as interconnected levers, plus a locking/releasing textile cord, which are incorporated into a riser assembly. The riser assembly can be releasably connected to a load suspending base ring. Being intended for use by human parachutists, and utilized in pairs, the prior devices are designed for some maximum working load, which is in the range of a few hundred pounds at the low end (sport parachutists) to several hundred pounds at the high end (military parachutists with equipment). In some instances, these prior release devices have been used for relatively low mass HALO (High Altitude Low Opening) type parachute cargo delivery systems. In such instances, there is typically a drogue parachute that must be released in mid-air which, in turn, functions as a pilot chute to deploy the cargo recovery parachute, or parachutes. For HALO cargo systems the prior release devices are typically used singly (thus halving the overall strength capability, as compared to human parachute systems where the prior release devices are utilized in pairs). To increase the strength capacity of the prior ring release devices, for example when used singly, versions have been designed in which the circular ring sizes have been increased; larger diameter rings provide longer lever arms. Additionally, 4-ring versions (3 releasable rings and 1 base ring) have also been utilized, which may also incorporate larger than typical rings.

However, if the lower releasable ring becomes larger, so must the base ring on the suspended item through which the releasable ring must enter and exit. Logically, as the rings become larger the release device becomes bulkier and/or heavier, which is generally undesirable. Another undesirable feature of prior 3-ring style release configurations is that a hole is cut through the textile webbing (the riser) to which the releasable, leveraging, rings are attached. The presence of this hole weakens the webbing. Consequently, stronger webbing must be utilized, which generally means thicker webbing, which leads to ever more difficult construction processes (e.g., sewing). Additionally, for cargo parachute systems utilizing a 3-ring type prior release device, even the requirement for a metal base ring is disadvantageous because the cargo typically needs a minimum of two attachment points and, therefore, two base rings that must interface with a single prior release device.

Figure 5A:
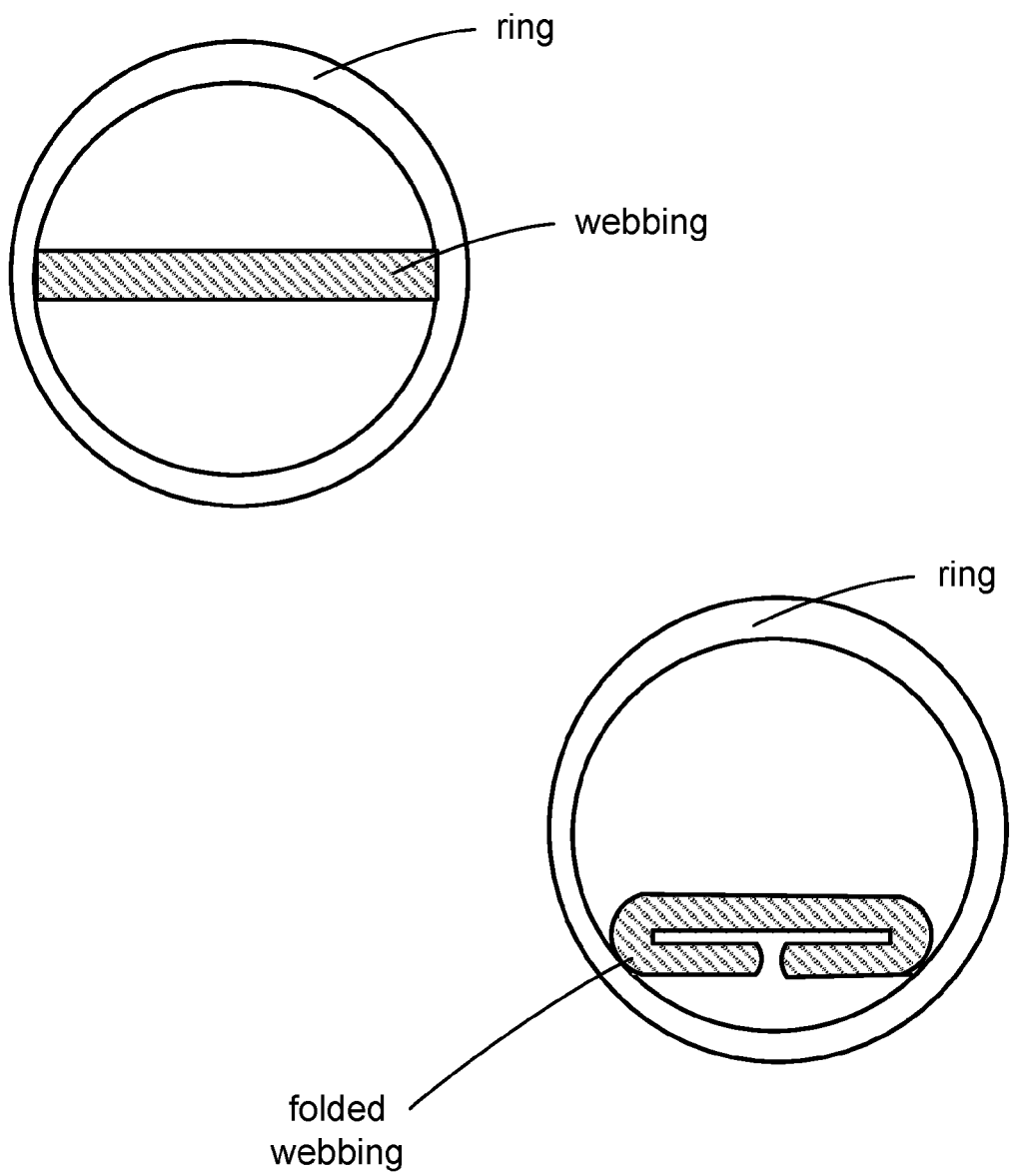
FIG. 5A illustrates force concentration associated with webbing passed through a release ring.
Figure 5B:
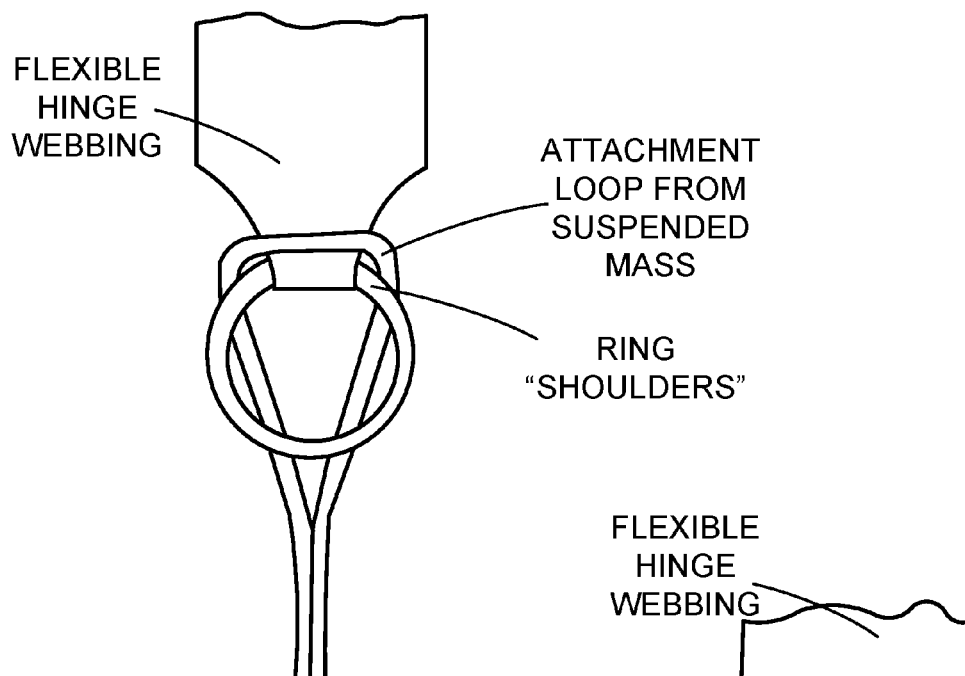
FIGS. 5B and 5C illustrate flexible webbing catching on the "shoulders" of a release ring.
Figure 5C:
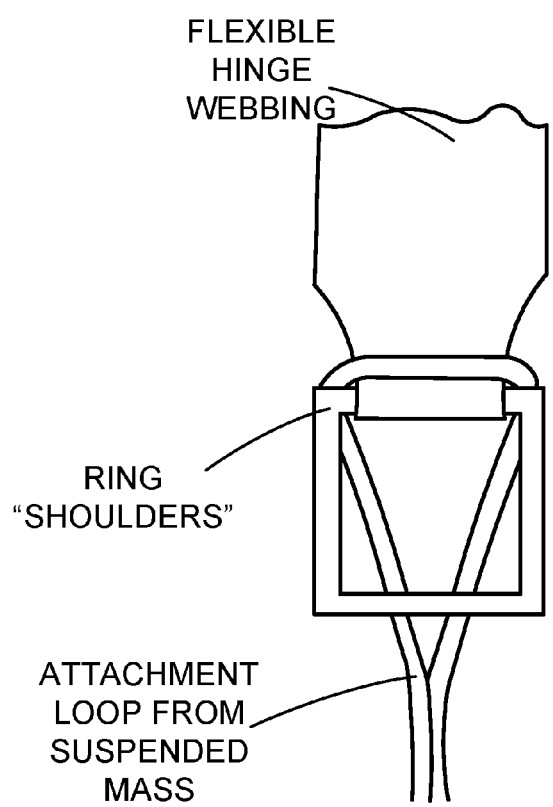

It will be appreciated that in ring-style release systems, the base ring is simply a connection point for the lower/lowest releasable ring and does not contribute to the mechanical advantage of the release device. In the case of releasable cargo, there may be advantages in connecting the release device to flexible loops (such as textile webbing), rather than to a base ring. However, during operation of the release system, a flexible loop can capture a releasable ring, which would prevent a successful release. Moreover, with momentary reference to FIG. 5A, in prior release systems the riser webbing to which the lower release ring is attached is typically folded to a reduced width to minimize "edge loading" of the webbing by the releasable ring. Such edge loading concentrates forces on two very small (outer) areas of the webbing and can cause a progressive failure of the webbing from a much lower applied force than the webbing's rated strength. Additionally, the lower release ring and folded webbing combination roughly form an hourglass or "figure-8" shape, which enhances the potential for a textile loop to grasp it undesirably, preventing separation. As can be seen in FIG. 5B, a flexible loop can become trapped, and prevented from releasing, when the flexible loop is engaged with a circular release ring. And as can be seen in FIG. 5C, this tendency is aggravated if a release ring has flattened or square shoulders.

In prior ring release systems, a hole is universally cut through the riser assembly so the upper ring locking/releasing loop can be routed through the hole to interface with the locking/releasing means, which is invariably located on the opposite side of the riser assembly. Additionally, the locking/releasing loop is typically sewn in place, making it an integral part of the riser assembly.

In contrast to the approaches and drawbacks of prior ring release systems, improved performance and safety maybe achieved via use of ring release systems configured in accordance with principles of the present disclosure. For example, as compared to prior systems, an exemplary ring release system 100 utilizes a lower release ring that is elongated, improving mechanical advantage. Additionally, an exemplary ring release system 100 comprises a lower release ring 140 that (i) can conveniently interface with either rigid hardware items, such as rings, or flexible elements, such as textile loops, and/or (ii) can be configured to minimize textile to textile contact when the payload connection means is textile (thus reducing and/or preventing undesirable friction wear and/or premature failure). Yet further, an exemplary ring release system 100 may be configured with an optional flexible extension 150; flexible extension 150 can be connected to the primary riser assembly with conventional parachute hardware, or it may be an integral part of the primary riser assembly. The optional flexible extension 150 can be conveniently passed through a variety of suspended cargo package attachment point types (including textile loops), eliminating the need for a metallic base ring to be coupled to the payload. Also, in an exemplary ring release system 100, there is no need for a hole to be cut through riser assembly 110 webbing to allow the flexible locking loop 112 to pass through it; this prevents significant weakening of the riser assembly 110 webbing without increasing the thickness or mass of the riser assembly 110 webbing. Moreover, in an exemplary ring release system 100, the flexible locking loop 112 can be easily replaced or adjusted in length, as desired. Yet further, in ring release system 100, release rings may be configured with extensions or other components which reduce and/or prevent the undesired catching of a flexible loop on the shoulders of a release ring during operation. And still further, in ring release system 100, various attachment means may be coupled to the back side of the riser webbing rather than to the front side, reducing and/or eliminating failed stitching due to peeling.

Figure 1B:
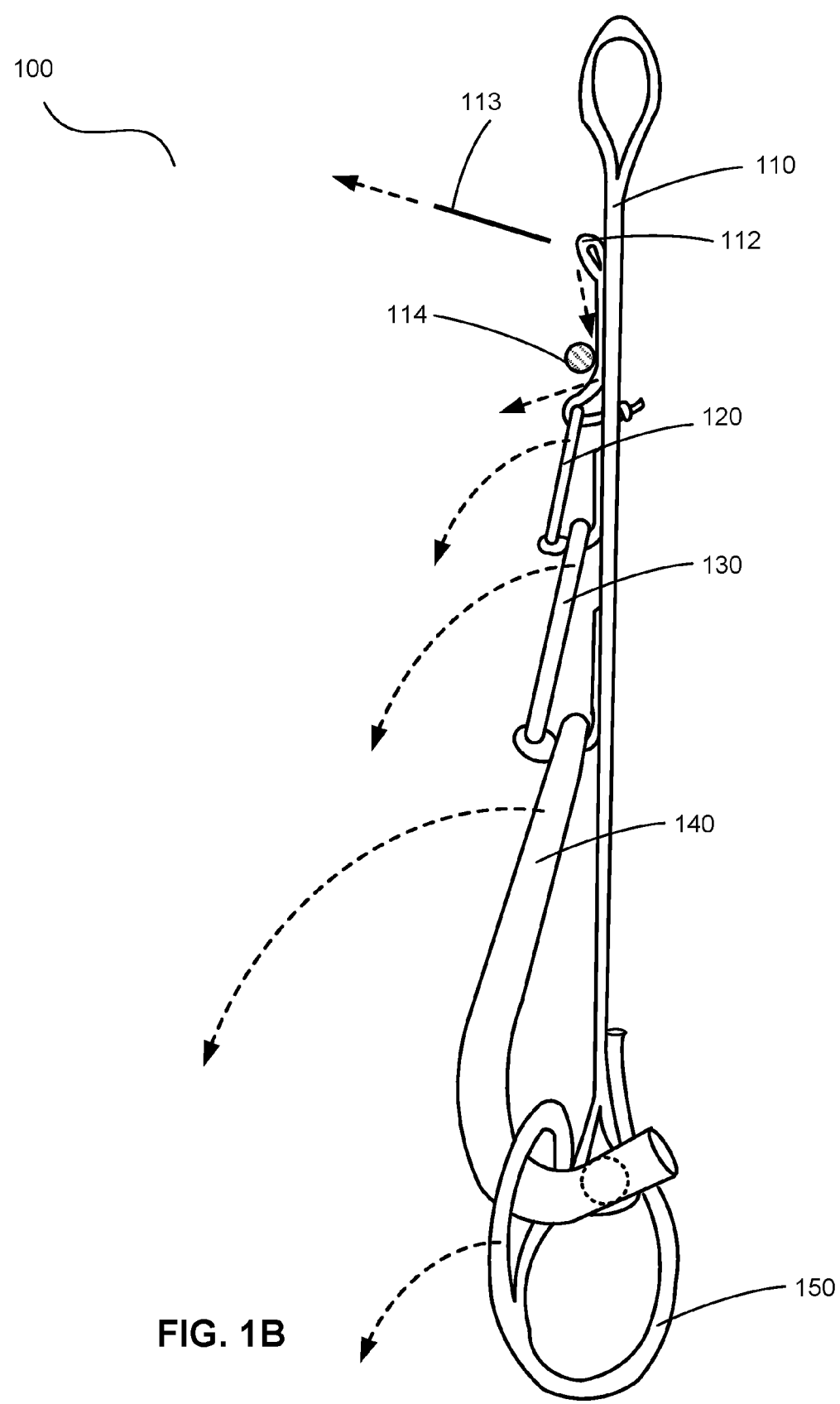
FIG. 1B illustrates operation of a ring release system in accordance with an exemplary embodiment.
Figure 10:
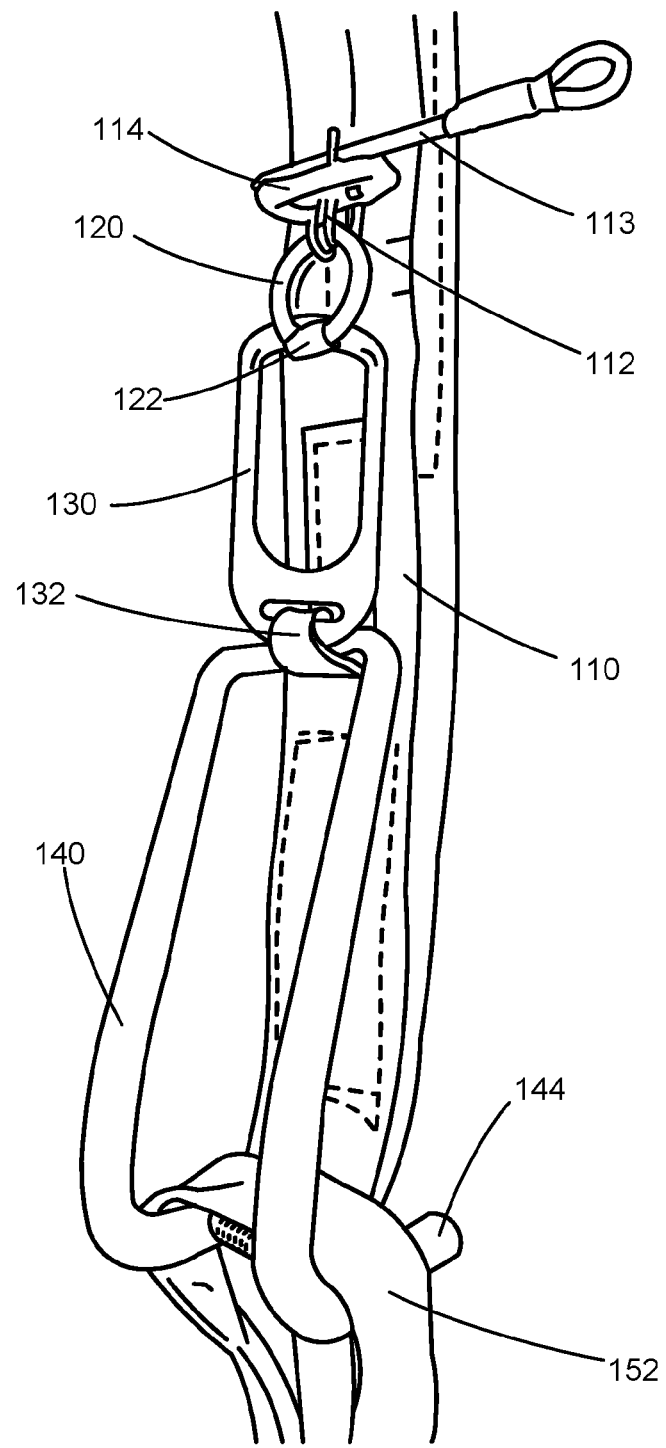
FIG. 10 illustrates a side perspective view of various assembled components of a ring release system in accordance with an exemplary embodiment.

With reference now to FIGS. 1A, 1B, and 10, in accordance with various exemplary embodiments a ring release system 100 may comprise one or more oblong, rectangular, and/or trapezoidal (elongated) rings in lieu of circular rings, particularly when ring release system 100 is configured for use with large and/or heavy loads. It will be appreciated that such a change may (but does not necessarily) decrease the length of ring release system 100 as compared to a prior system, but it will decrease the width of ring release system 100 relative to its length, as compared to a prior system. Additionally, in various exemplary embodiments a lower, elongated, release ring 140 is configured with the novel capability of interfacing with (and conveniently releasing from) flexible materials, such as textile loops, without the need for base rings (or any rigid hardware whatsoever) to act as an interface.

In an exemplary ring release system, for example ring release system 100, an elongated ring can produce relatively higher mechanical advantage for a ring of any given width because the length of the lever arm can be significantly greater than the width. Additionally, an elongated lower release ring 140 can be more conveniently configured to cleanly release from a flexible loop than can a circular ring.

A ring release system 100 comprises components configured to releasably connect two or more objects, for example a parachute to a payload. With reference now to FIG. 1A, in an exemplary embodiment ring release system 100 comprises a riser assembly 110, a locking loop 112, a loop hold-down 114, upper release ring 120, flexible hinge 122, intermediate release ring 130, flexible hinge 132, and lower release ring 140. Ring release system 100 may also comprise flexible extension 150.

In various exemplary embodiments, riser assembly 110 comprises textile webbing. Because ring release system 100 is often incorporated into a parachute harness, textile webbing is well suited for that application. However, for other applications, for example aerial delivery of cargo, riser assembly 110 may comprise a rigid material, for example steel. In particular, when ring release system 100 is utilized in an application where extended exposure to the elements is anticipated, use of rigid and/or semi-rigid materials may be desirable. However, any suitable materials may be utilized to form riser assembly 110.

At the top of riser assembly 110, a loop 111 may be provided that allows a drogue chute or other components to be easily attached thereto. In ring release system 100, riser assembly 110 is operative as a "base" or "substrate" to which various other components are permanently affixed.

With continued reference to FIG. 1A, in various exemplary embodiments ring release system 100 comprises a locking loop 112 coupled to riser assembly 110. Locking loop 112 may comprise a textile loop that is typically secured by having a releasing pin 113 routed through it. However, in some instances of parachute delivered cargo, the releasing pin 113 may be replaced with a pyrotechnic cutting device installed on the loop.

In various exemplary embodiments, it is desirable that upper release ring 120 is held close to riser assembly 110 by locking loop 112. Therefore, an element positioned proximate to upper release ring 120 may be utilized to hold locking loop 112 close to riser assembly 110. Loop hold-down 114 is operable for this purpose. Loop hold-down 114 may comprise a steel or plastic bar or other suitable durable materials, as desired.

Upper release ring 120 comprises a durable metal, for example aluminum, steel, or the like. Upper release ring 120 may be circular or elongated, depending on the amount of mechanical advantage that is desired by the system designer.

Flexible hinge 122 is configured to rotatably retain upper release ring 120 to riser assembly 110. Flexible hinge 122 may be passed through a central orifice of upper release ring 120; alternatively, flexible hinge 122 may be passed through a slot or hole in upper release ring 120 in order to couple thereto. In various embodiments, flexible hinge 122 comprises textile webbing. In other embodiments, flexible hinge 122 comprises cord. However, any suitable materials may be utilized. For example, flexible hinge 122 may comprise a durable metal, such as steel. In some exemplary embodiments, flexible hinge 122 may be spring loaded, such as a cocked mousetrap is spring loaded. By allowing upper release ring 120 to rotate, flexible hinge 122 facilitates separation of upper release ring 120 from intermediate release ring 130 responsive to release of locking loop 112, for example as illustrated in FIG. 1B.

Turning now to FIGS. 1A, 1B, 2A through 2J, and 4A through 4C, in various exemplary embodiments, intermediate release ring 130 comprises a durable metal, for example, steel, aluminum, and/or the like.

For securing lower release ring 140, intermediate release ring 130 may be circular, but it is desirable to utilize an elongated intermediate release ring 130 to increase the capability of ring release system 100. In other words, mechanical advantage exists and/or is improved if intermediate release ring 130 is longer than the interior width of lower release ring 140; this cannot be the case if intermediate release ring 130 is circular.

Figure 4C:
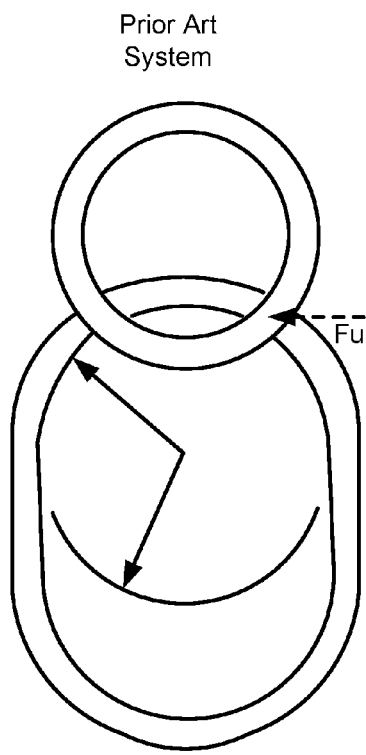
FIG. 4C illustrates configurations for an exemplary intermediate release ring and/or lower release ring of a ring release system in accordance with various exemplary embodiments.
Figure 4C:
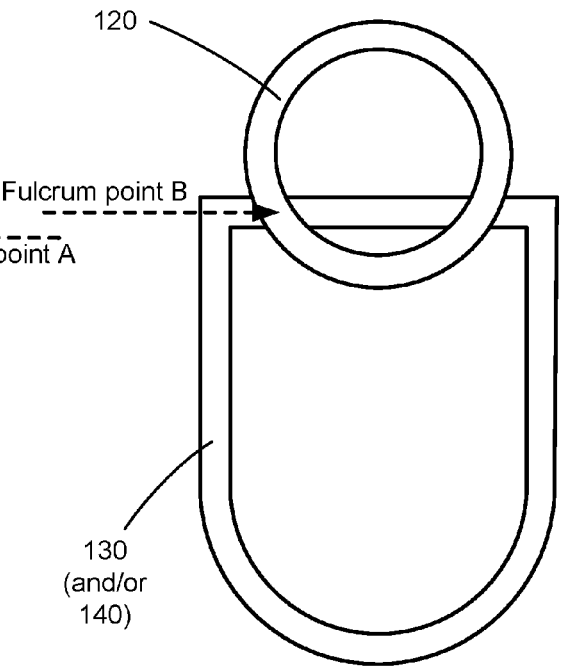
Figure 4C:
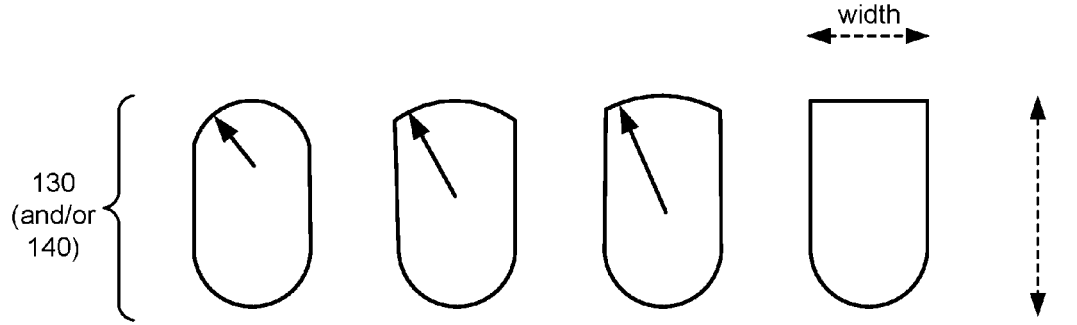

It will be appreciated that while certain prior ring release systems, for example Auvray (U.S. Pat. No. 6,983,913), gained mechanical advantage over the original Booth system by elongating/lengthening the lower release ring, the Auvray system did not maximize the effect of the lengthening. As shown in FIG. 4A, Auvray discloses an elongated ring that is configured with the same end radius as if the ring had been circular (stated another way, the radius of the arc at the end of the ring is 50% of the width of the ring). Relative to that arc, and the ring that latches it in place, the fulcrum point (Fulcrum point A) is in a particular location. In contrast, with reference to FIGS. 4B and 4C, in various exemplary embodiments at least one end of intermediate release ring 130 is configured with either: (i) an arc having a radius greater than 50% of the width of intermediate release ring 130; or (ii) a flat end (i.e., no outward curvature). As can be seen by a comparison between FIGS. 4A and 4B, intermediate release ring 130 offers a fulcrum point (Fulcrum point B) that creates a longer lever arm as compared to prior systems, even if the physical length of intermediate release ring 130 remains the same as the length of a corresponding ring in a prior ring release system.

As illustrated in FIG. 4C, as the radius of the arc increases above 50% of the width of the ring, the fulcrum point moves ever upward, and produces a relatively longer lever arm as the overall length of intermediate release ring 130 remains constant. It will be appreciated that the rightmost (flat-ended) shape in FIG. 4C depicts the most advantageous shape for a particular end of intermediate release ring 130 to achieve increased length of the lever arm without increasing the overall length of intermediate release ring 130. Moreover, various combinations of lengths, widths, curvatures, and/or the like may be utilized in intermediate release ring 130 in order to achieve a desired size, weight, and/or performance of ring release system 100. It will be appreciated that various configurations for intermediate release ring 130 may be utilized in order to achieve a preferred and/or optimal shape for a particular application and/or set of requirements.

In various exemplary embodiments, with reference to FIGS. 2A through 2F, 4B, 7A, and 7B, the ends of intermediate release ring 130 may be identically curved to one another, or may differ in curvature. Moreover, intermediate release ring 130 may comprise at least one end that is neither circular nor semicircular or arctuate (i.e., is "flat"). Intermediate release ring 130 may be rotated in connection with operation of flexible hinge 132, for example as illustrated in FIGS. 1A and 1B.

Figure 2A:
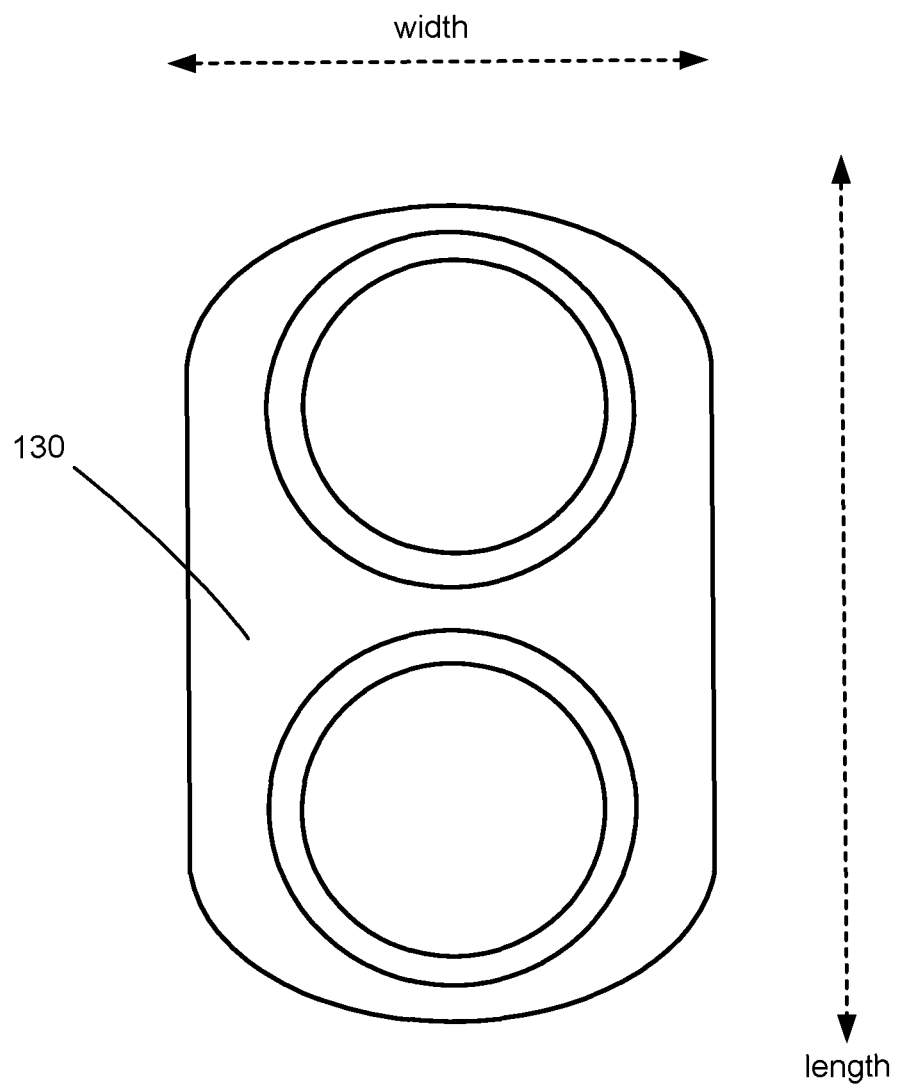
FIGS. 2A, 2B, 2C, and 2D illustrate various configurations of exemplary intermediate release rings configured with a slot for interfacing with attachment webbing in accordance with various exemplary embodiments.
Figure 2D:
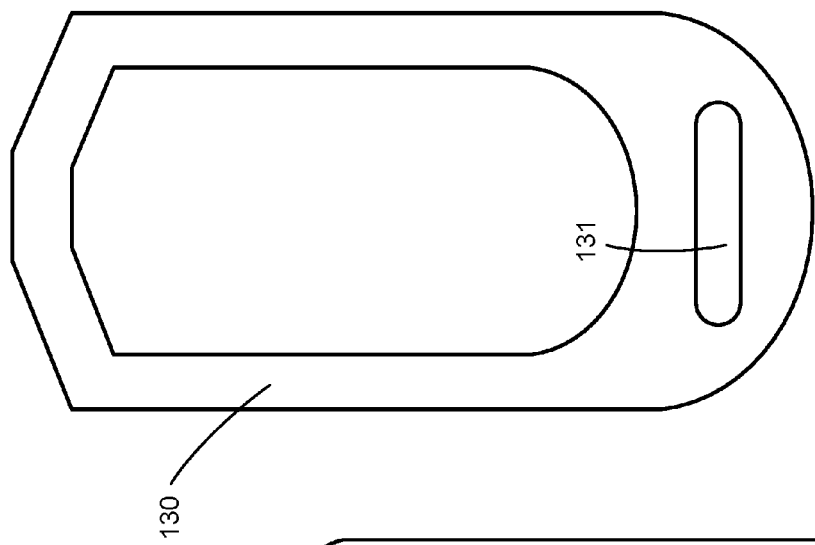
Figure 2C:
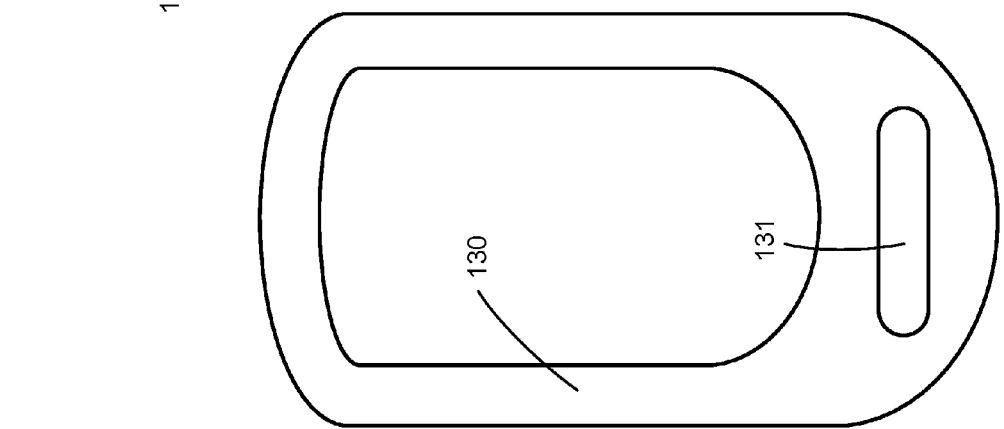

In various exemplary embodiments, while it is appreciated that a flat end of intermediate release ring 130 provides the most efficient lever geometry, it may be desirable to utilize a small amount of curvature on one end of intermediate release ring 130 (for example, as illustrated in FIGS. 2C, 2E, and 2F), in order to reduce any tendency of intermediate release ring 130 to wander laterally with respect to upper release ring 120 and/or flexible hinge 122 when passed therethrough.

Figure 2B:
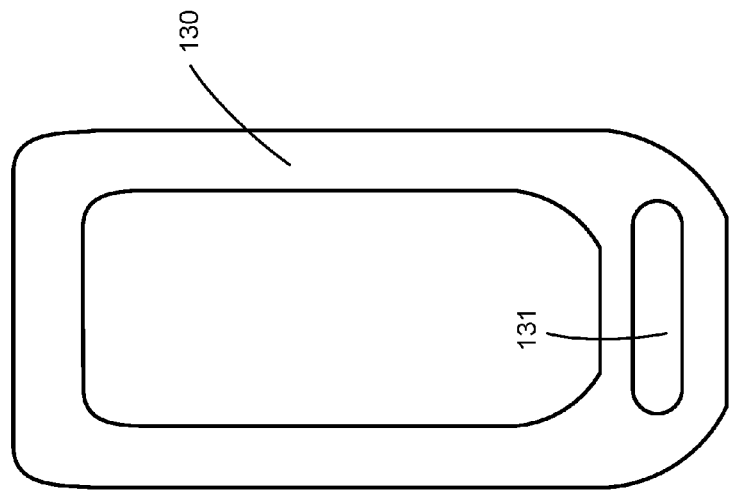

In various exemplary embodiments, with reference now to FIGS. 2B, 2C, and 2D, intermediate release ring 130 is configured with a slot 131 therethrough to facilitate coupling of intermediate release ring 130 to riser assembly 110, for example via flexible hinge 132. In other exemplary embodiments, with reference to FIGS. 2E, 2F, and 2K, intermediate release ring 130 is configured with one or more holes 133 therethrough to facilitate coupling of intermediate release ring 130 to riser assembly 110. Holes 133 may be radiused in order to reduce and/or eliminate undesirable wear on textile components of ring release system 100. Holes 133 may traverse intermediate release ring 130 in any suitable path (for example, laterally, or in a direction perpendicular to the ring face).

Intermediate release ring 130 may be configured with any suitable number of holes 133, for example one hole 133, two holes 133, three holes 133, four holes 133, and/or the like, as desired. Hole(s) 133 are preferably located on intermediate release ring 130 in an arrangement that is symmetric about the centerline of intermediate release ring 130 in order to equalize distribution of load forces. Each hole 133 may be circular, ovoid, elliptical, or other suitable shape.

In some exemplary embodiments, flexible hinge 132 may comprise the same or similar materials to, and operate in a manner similar to, flexible hinge 122, but with respect to intermediate release ring 130 as can be seen in FIGS. 1A and 1B. However, in other exemplary embodiments, with reference now to FIGS. 2E and 2F, flexible hinge 132 may comprise a plurality of cords, for example cords comprising nylon, polyester, para-aramid fibers such as Kevlar®, high molecular weight polyethelyne fibers such as Spectra®, and/or the like, or combinations of the same. In these exemplary embodiments, each cord comprising flexible hinge 132 may be routed through a corresponding hole 133 in intermediate release ring 130. When flexible hinge 132 comprises cords rather than webbing, various strength and reliability improvements may be realized in ring release system 100 as detailed below.

Figure 2G:
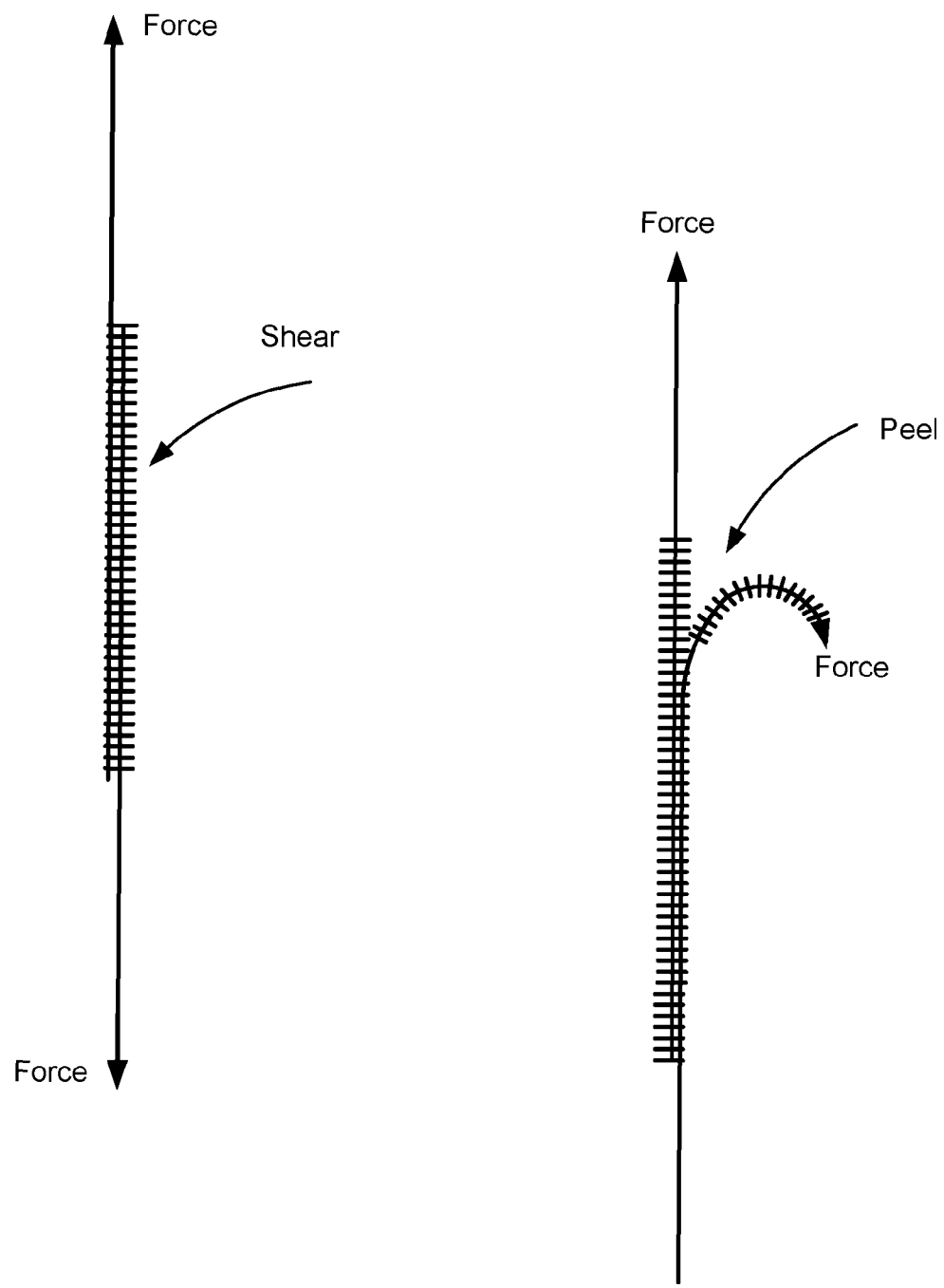
FIG. 2G illustrates shear and peel in stitched components in accordance with various exemplary embodiments.

Turning now to FIG. 2G, in all prior ring release systems each ring above the lowest releasable ring was attached to the base riser webbing via stitching of the corresponding attachment webbing to the front side of the base riser webbing. However, this attachment method suffers from a serious drawback: risk of peeling failure.

In a ring release system, for example ring release system 100, if excessive interfacing material (for example, metal rings, textile slings, and/or the like) is positioned between lower release ring 140 and riser assembly 110, when the components are put under typical tension, or when an excessive tension load is applied to lower release ring 140 that otherwise interfaces with properly sized components and/or material (for example, flexible extension 150, or an appropriately sized base ring or textile loop), an excessive outward force is resultingly applied to intermediate release ring 130. This causes the stitches securing the attachment webbing (for example, the stitches securing flexible hinge 132) to be exposed to a peeling force, leading to the risk of the stitching separating in a manner similar to a zipper separating. FIG. 2G illustrates stitches subject to a shearing force, and stitches subject to a peeling force. It will be appreciated that stitches in shear are collectively much stronger than isolated stitches in peel.

By way of example, in an exemplary configuration of ring release system 100, the geometry of the components is such that if 15,000 pounds is suspended by lower release ring 140, there is an ~1,425 pound "outward" force placed on the top of lower release ring 140 (i.e., a force pulling the top of lower release ring 140 away from riser assembly 110). It will be appreciated that it is not uncommon for a parachute to develop a force of ~3G's as it initially opens; accordingly, a 5,000 pound suspended mass can impose a ~15,000 pound equivalent force for a short period of time. In the configuration illustrated in FIG. 2H where intermediate release ring 130 is secured to riser assembly 110 via flexible hinge 132 comprising webbing, the only thing preventing flexible hinge 132 from being torn from the front of riser assembly 110 due to the outward force arising at the top of lower release ring 140 is the stitching loaded in peel between flexible hinge 132 and riser assembly 110. 1,425 pounds of peel tear out strength is fairly close to the state of the art stitching capacity for such an application; in other words, if the parachute inflation G's were closer to 4 or 5, the stitching coupling riser assembly 110 and flexible hinge 132 might fail.

Figure 2J:
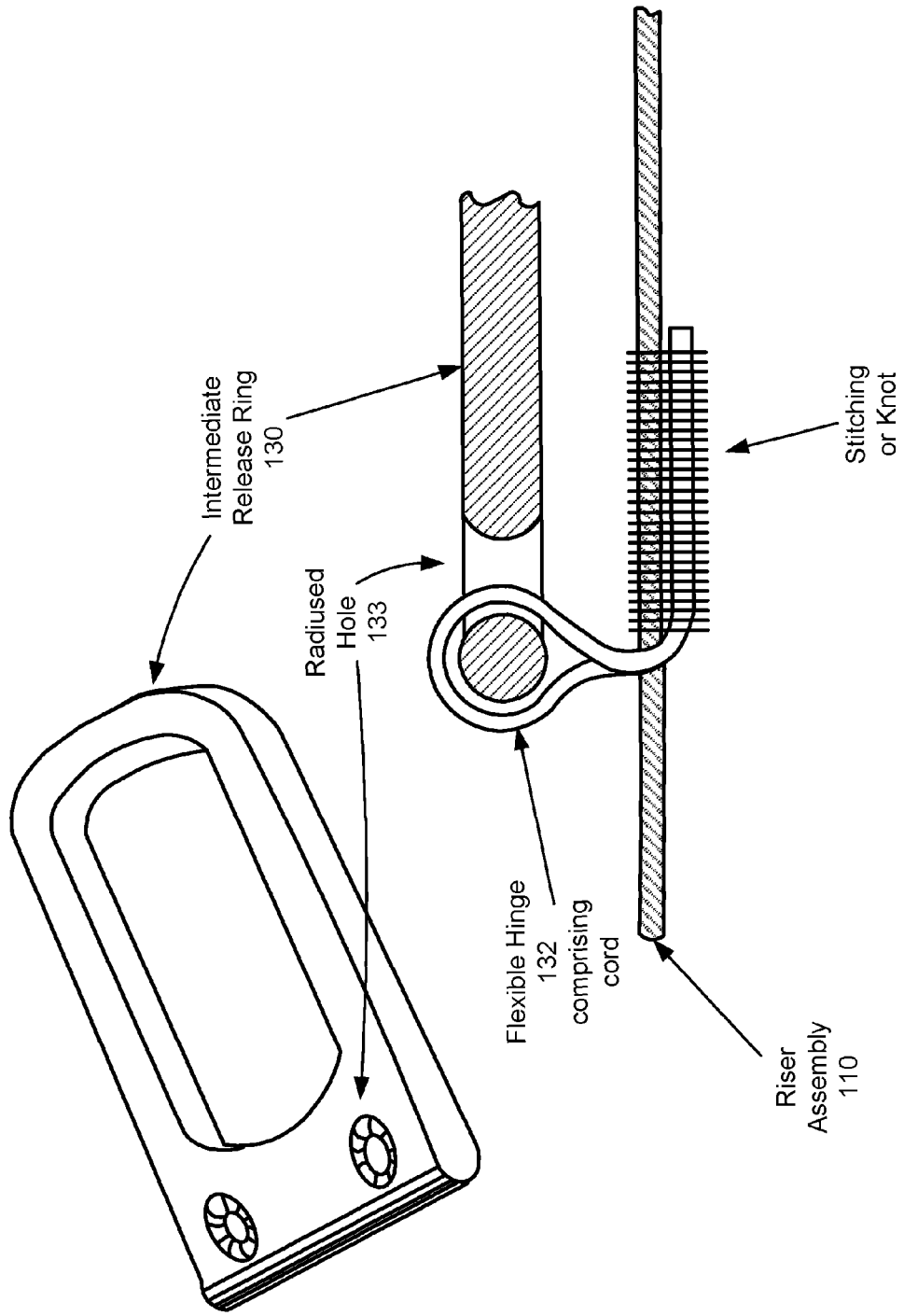
FIG. 2J illustrates side and perspective views of an intermediate release ring coupled via cord to the back side of a riser assembly in accordance with various exemplary embodiments.

Accordingly, in various exemplary embodiments and with reference now to FIGS. 2I and 2J, in order to reduce and/or eliminate peeling failure of components in ring release system 100, intermediate release ring 130 is coupled to riser assembly 110 via flexible hinge 132 comprising cords instead of webbing. In these exemplary embodiments, the cords comprising flexible hinge 132 may be routed through the weave of one or more layers of the webbing comprising riser assembly 110 without any cutting of riser assembly 110 material. For example, an awl or other object may be utilized to temporarily spread the weave of one or more layers of the webbing comprising riser assembly 110 in order to pass a cord therethrough. The cords may then be coupled to the back side of webbing comprising riser assembly 110, for example via stitching, by placement of a knot in the cord, or other suitable technique. In some exemplary embodiments, the cords may be routed through the weave of a first layer of webbing comprising riser assembly 110 without being routed through the weave of a second layer of webbing comprising riser assembly 110; stated another way, the ends of the cords may be "sandwiched" between layers of webbing comprising riser assembly 110 and may be stitched in place therebetween. In other exemplary embodiments, the cords may be routed through the weave of all layers of webbing comprising riser assembly 110 and thus coupled to the back side of riser assembly 110, for example via stitching as illustrated in FIGS. 2I and 2J.

Figure 2K:
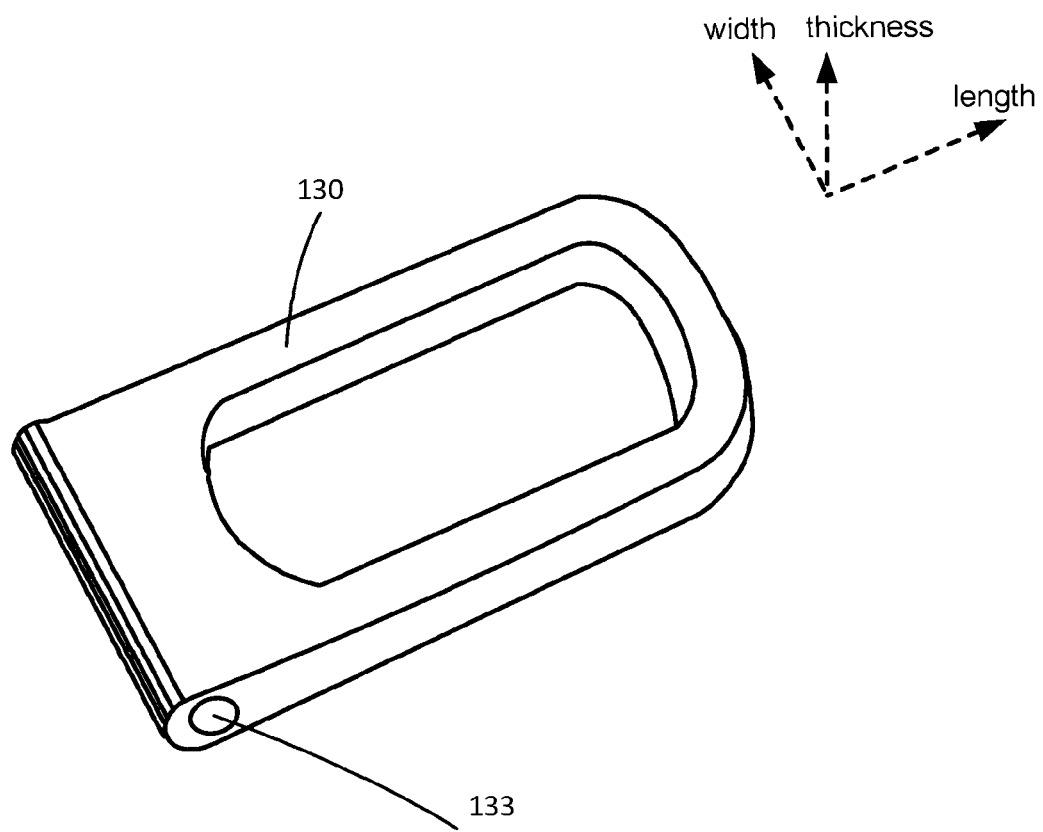
FIG. 2K illustrates a perspective view of an intermediate release ring with a lateral hole configured for coupling via cord to the back side of a riser assembly in accordance with various exemplary embodiments.

To facilitate coupling of intermediate release ring 130 to riser assembly 110 via cords, intermediate release ring 130 may be configured with one or more holes 133. Holes 133 may be disposed perpendicular to the face of intermediate release ring 130, for example as illustrated in FIGS. 2E, 2F, 2I, and 2J. Alternatively, a hole 133 may traverse laterally through intermediate release ring 130, for example as illustrated in FIG. 2K. Moreover, intermediate release ring 130 may be configured with a pin protruding out from each side in order to couple to a set of cords. Any suitable geometry and/or configuration may be utilized in order to facilitate coupling of intermediate release ring 130 to the back side of webbing comprising riser assembly 110 via cords.

In these exemplary embodiments wherein flexible hinge 132 comprises cords and is coupled to the back side of (and/or between layers of) webbing comprising riser assembly 110, it will be appreciated that the stitches coupling flexible hinge 132 and riser assembly 110 cannot be placed in peel by any force placed on intermediate release ring 130. Accordingly, the technique of sewing the cord tails of flexible hinge 132 to the back side of (and/or between layers of) the webbing comprising riser assembly 110 makes a much stronger joint than the previously used technique of sewing the ring attachment webbing to the front side of the base webbing. In this manner, ring release system 100 may be configured to reduce and/or eliminate system failures arising from peeling tear-outs. Furthermore, it will be appreciated that upper release ring 120 and flexible hinge 122 may be configured in a manner similar to intermediate release ring 130 and flexible hinge 132, in order to couple flexible hinge 122 to the back side of (and/or in between layers of) webbing comprising riser assembly 110 and thus prevent and/or eliminate peeling forces related thereto.

Returning now to FIGS. 1A, 1B, and 3A through 3F, in various exemplary embodiments, ring release system 100 is configured with lower release ring 140; lower release ring 140 differs substantially from release rings utilized in prior ring release systems.

In prior 3-ring release systems, the mass carrying base ring is suspended directly by the textile webbing that is utilized to attach the lower release ring to the riser assembly. The lower release ring supports one end of the flexible hinge, but does not directly support the base ring. For cargo parachute systems this configuration is undesirable, especially if the base ring is replaced with a textile loop, because high speed or high frequency movement between two textile elements can often cause friction damage (i.e., melting, abrasion, and the like).

In contrast to this additional problem suffered by prior approaches, friction damage is much less likely to occur when ring release system 100 is utilized. When the base ring is replaced with a textile element, the textile to textile interface may be eliminated by forming lower release ring 140 in such a way that the contact area for the mass carrying textile is lower than the attachment/lower pivot pin 142 for lower release ring 140. Such a lower ring, which is typically roughly rectangular in a frontal view, is lower release ring 140. In addition to the round lower pivot pin 142, lower release ring 140 may also be configured with a lateral stiffener 146 in order to strengthen lower release ring 140. From a side view, in some exemplary embodiments lower release ring 140 is curved, for example roughly "J" shaped (for example, as seen in FIGS. 1A, 1B, and 3C through 3F); in contrast, in all prior ring release systems, all the releasable rings coupled to the riser were planar from a side view. In other exemplary embodiments, lower release ring 140 may be configured as planar from a side view.

Figure 9A:
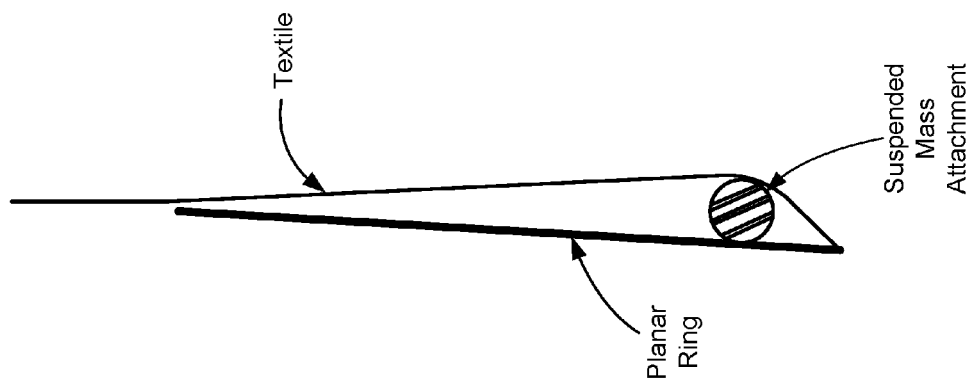
FIG. 9A illustrates configuration of portions of a ring release system utilizing a "J"-shaped lower release ring vs. a planar ring in accordance with an exemplary embodiment.
Figure 9A:
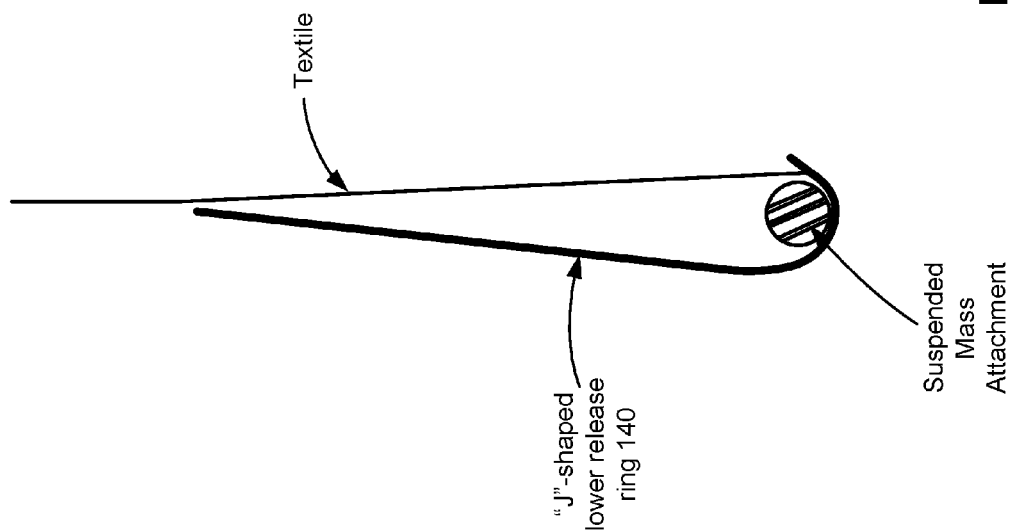

With momentary reference now to FIG. 9A, it will be appreciated that, due to gravitational force, in any ring release system the center of the suspended mass (represented by the slashed circle) will always align directly beneath the suspension point (represented by the vertical line at the top of each illustration). In various exemplary embodiments, when a J-shaped lower release ring 140 is utilized, the lower release ring 140 can be configured to accommodate some particular maximum diameter or maximum thickness of the suspended mass attachment element. Based on that configuration, the moment arm from the bottom of the textile riser element to the center point of the mass attachment element can be determined. Also, the moment arm value of the long, nearly vertical, portion of the "J" shape of lower release ring 140 can be determined. Furthermore, the interface between the "valley" at the bottom of the "J" and the mass attachment can be mechanically efficient. Beyond that, contact between the suspended mass attachment and the textile riser element can be eliminated or minimized. And, unless the mass attachment element is too large in diameter, or too thick, these geometric relationships will always be constant.

For example, when an assembly, such as a ring release mechanism, is designed for some specific strength, or to determine the strength of an existing assembly, it is not enough to just know the strength of the materials. It is also necessary to know how and where forces will be applied. In an ideal situation, for example as illustrated in FIG. 9B, the vertical centerline of the suspended mass will be directly above some specific point on the lower arc of J-shaped lower release ring 140. In this case, the vertical centerline of the suspended mass is shown as the dividing line between "a" and "b". If there is no horizontal force acting on the suspended mass, the centerline will remain at that point regardless of the amount of mass being suspended. With the "a", "b" and "c" dimensions known and kept constant, the system designer can determine how much force will be applied and in what direction. For example, the system designer can determine how much outward force would be applied to the top of lower release ring 140 and therefore, how much force intermediate release ring 130 would have to counteract, and so forth. Thus, via application of principles of the present disclosure, design of an exemplary ring release system 100 is both simplified and made more reliable.

In contrast, when a planar lower release ring is utilized, all of the geometric relationships are driven by the diameter or thickness of the suspended mass attachment element. If the attachment element was rigid, the length of the textile that extends from the pivot point up to the top of the ring would change if the diameter and/or thickness of the element changes. If that element was textile, determining the thickness under varying conditions would be extremely difficult. That portion of the riser could be made long enough to form a loop that would hang below the planar ring, which would eliminate the geometry issues above, but the ring would then become just a suspension element, not a lever. Without such a loop, it is extremely difficult to determine how efficient the interface between the suspension element and the riser assembly is. And, without such a riser loop, the suspended mass element would produce an outward (spreading) force on the planar ring, and the amount of force produced would be dependent on the diameter and/or thickness of the suspended mass attachment element. Additionally, a planar arrangement would maximize textile to textile contact if the suspended mass attachment element was textile. Yet further, a planar arrangement is highly susceptible to having a flexible mass suspension element catch on the "shoulders" of the ring, thus failing to separate when desired. To eliminate these disadvantages and capture the advantages previously discussed, in various exemplary embodiments lower release ring 140 is preferentially configured with a three-dimensional (i.e., nonplanar) shape, for example the "J"-shape discussed above.

Figure 9C:
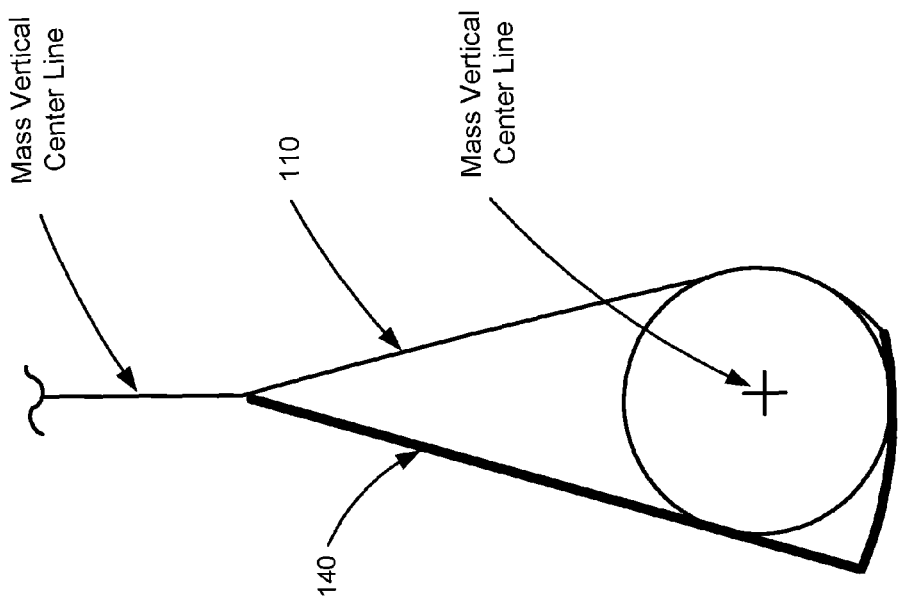
FIG. 9C illustrates ring release system design drawbacks associated with failure to utilize principles of the present disclosure.
Figure 9B:
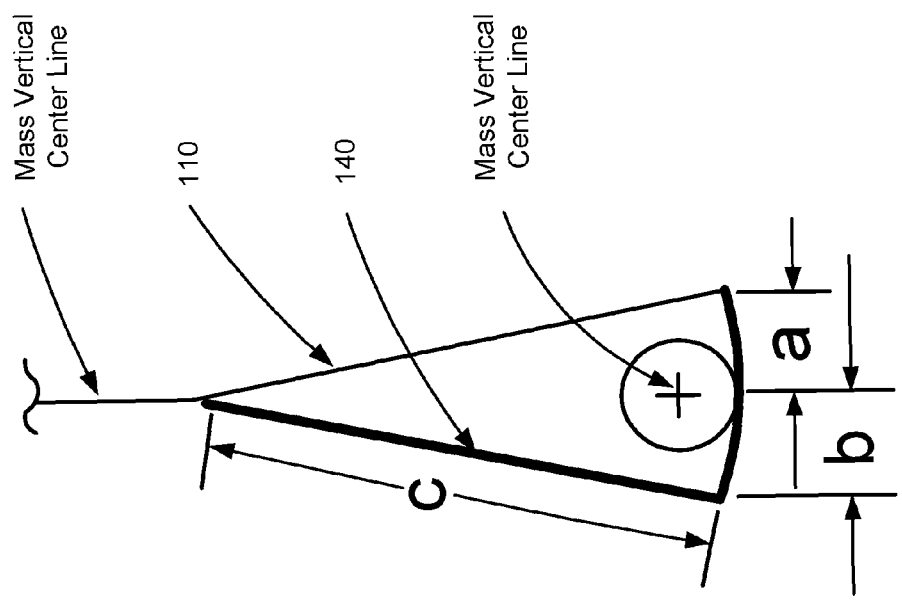
FIG. 9B illustrates ring release system design advantages arising from use of a ring release system configured in accordance with principles of the present disclosure.

Moreover, as illustrated in FIG. 9C, it will be appreciated when the diameter of a mass suspension point exceeds the capability of lower release ring 140 to accommodate in a centered position, the larger diameter mass suspension point cannot move to the natural center of the arc of lower release ring 140 and is pinched between lower release ring 140 and riser assembly 110. The pinching effect applies an additional outward force on the top of lower release ring; a force that would change with each oversized diameter that would be encountered. If the oversized element was a solid rod, for instance, system capacity calculations would be feasible. But if the oversized element was a textile, it would be extremely difficult to determine the exact cross section size, a size that would change as different amounts of force were applied to it.

Additionally, the contact point between the top of lower release ring 140 shown in FIG. 9B and riser assembly 110 is a constant. In contrast, when an oversized suspension element is utilized (or an undersized lower release ring 140 is utilized) the contact point on riser 140 moves up or down depending on the size of the oversized suspension element. Since that contact point is where intermediate release ring 130 is anchored, any up or down movement of that point would affect the fulcrum point location for intermediate release ring 130, thus adding additional unknowns to the system geometry calculations and resulting in a less reliable and/or unnecessarily oversized system.

In various exemplary embodiments, lower release ring 140 comprises steel. Lower release ring 140 may also comprise aluminum or other durable material. In various exemplary embodiments, with reference to now FIGS. 3E and 3F, lower release ring 140 is configured with a central plate 147. Central plate 147 is operative to strengthen lower release ring 140 against the compression loading resulting from a suspended mass being coupled to lower release ring 140. In this manner, lower release ring 140 may be made smaller and/or lighter, while still being suitable for use with a particular suspended mass. Additionally, via use of central plate 147, lower release ring 140 is configured with various orifices (for example, orifice #2 and #3 shown in FIG. 3F) whereby webbing or other flexible elements may be passed through lower release ring 140 while being generally held close to lower pivot pin 142 or an upper pivot pin 143.

In some embodiments, central plate 147 comprises a rigid plate that is welded, cast, machined, and/or forged between opposite sides of lower release ring 140. In other embodiments, central plate 147 comprises a series of pins; in other words, central plate 147 may comprise a single element (e.g., a sheet) or group of elements (e.g., a set of bars, plates, tubes, or the like). Central plate 147 may comprise any elements or combination of elements configured to provide mechanical strengthening to lower release ring 140. In various exemplary embodiments, central plate 147 comprises steel, aluminum, or other durable material.

Mechanically, with reference to FIG. 5B, it is known that tension forces can cause a flexible loop to grasp a circular ring because the ring forms "shoulders". Additional tension force will only cause the grasping force to become more securely engaged. Accordingly, it will be appreciated that in ring release system 100, if lower release ring 140 is configured as a simple rectangle with approximately 90 degree corners (for example, as illustrated in FIG. 5C), the tendency for a flexible loop to grasp the ring would be even greater than it would be for a circular ring if some grasp preventing means was not incorporated. Thus, in various exemplary embodiments lower release ring 140 is configured with features operable to prevent lower release ring 140 from being undesirably grasped by a flexible loop. For example, with reference to FIGS. 3A and 3B, lower release ring 140 may be configured with a portion or portions that extend a portion or portions of lower release ring 140 some distance beyond the point of attachment to the base webbing, for example ring extensions 144. The presence of ring extensions 144 makes the "shoulders" of lower release ring 140 significantly inaccessible to a flexible loop. In various exemplary embodiments, with momentary reference to FIG. 3A, ring extensions 144 may comprise finger-like protrusions; one on each side of lower release ring 140.

Figure 3A:
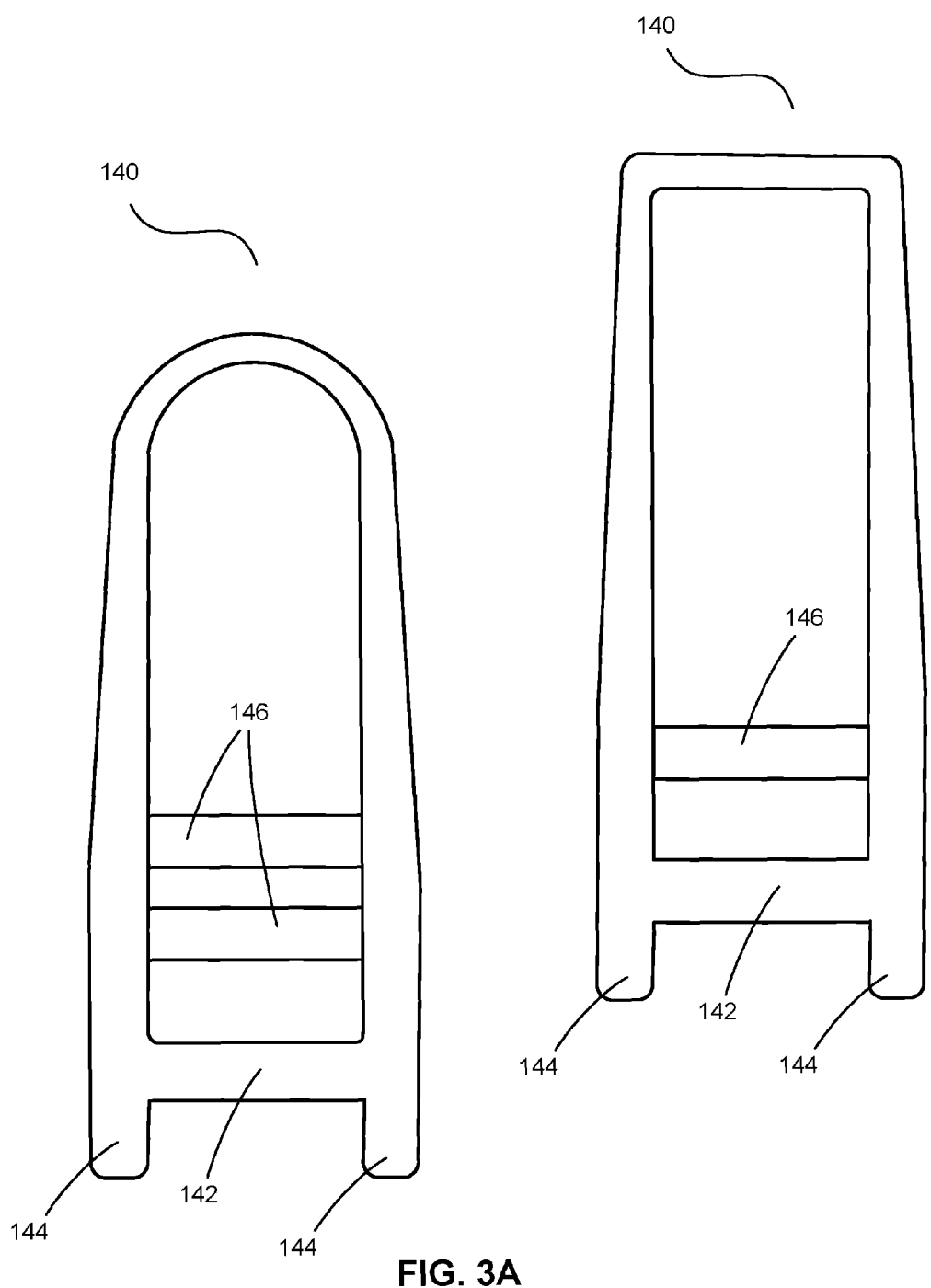
FIGS. 3A and 3B illustrate configurations of an exemplary lower release ring of a ring release system in accordance with various exemplary embodiments.
Figure 3B:
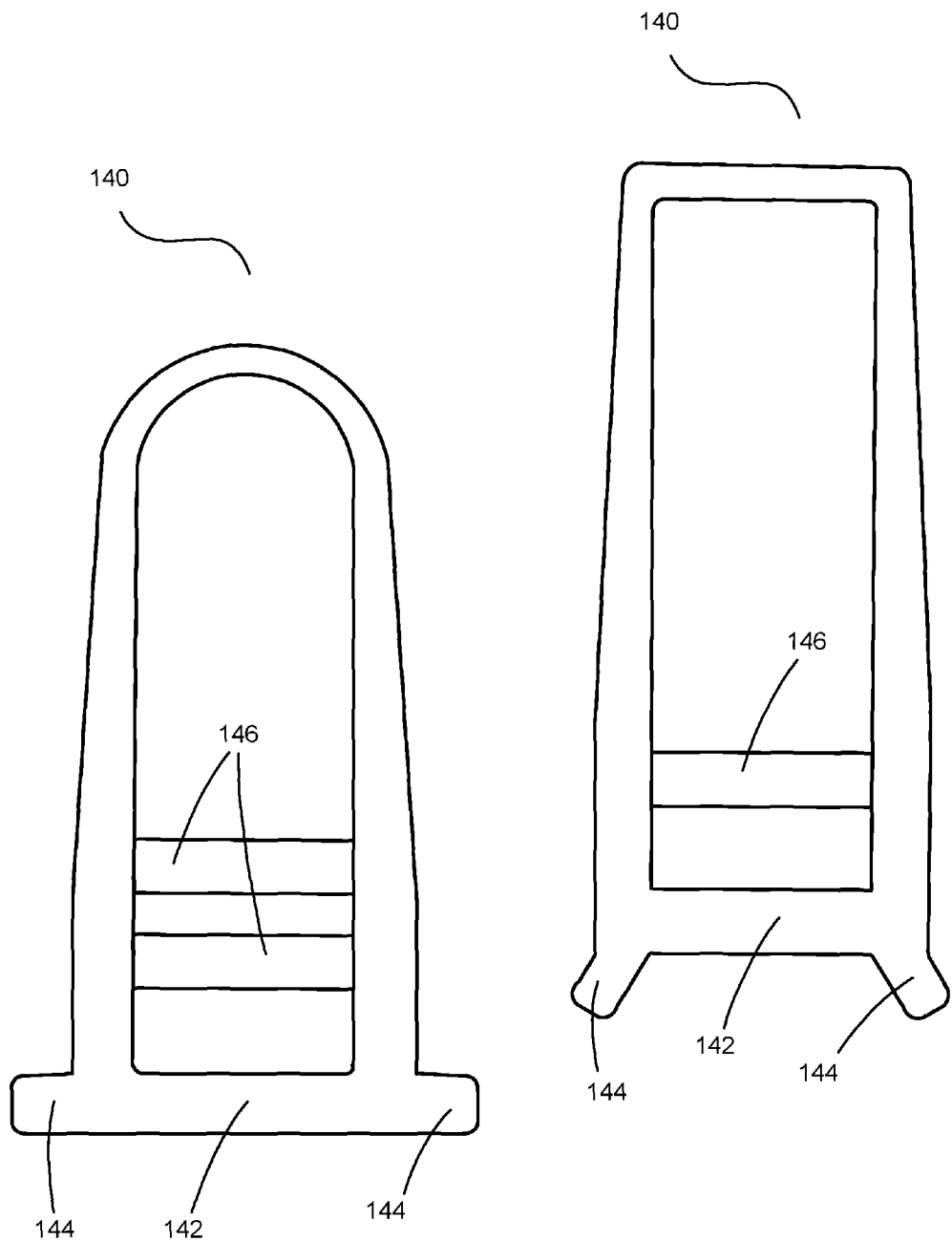
Figure 3C:
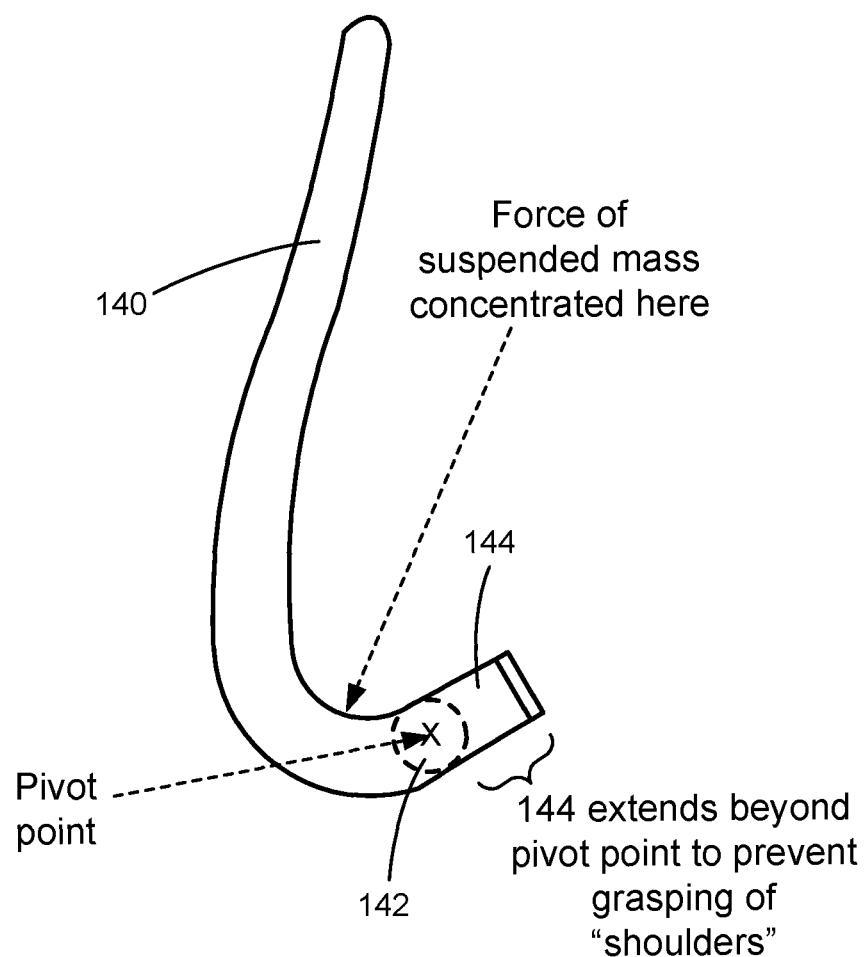
FIGS. 3C and 3D illustrate side views of a lower release ring of a ring release system in accordance with various exemplary embodiments.
Figure 3D:
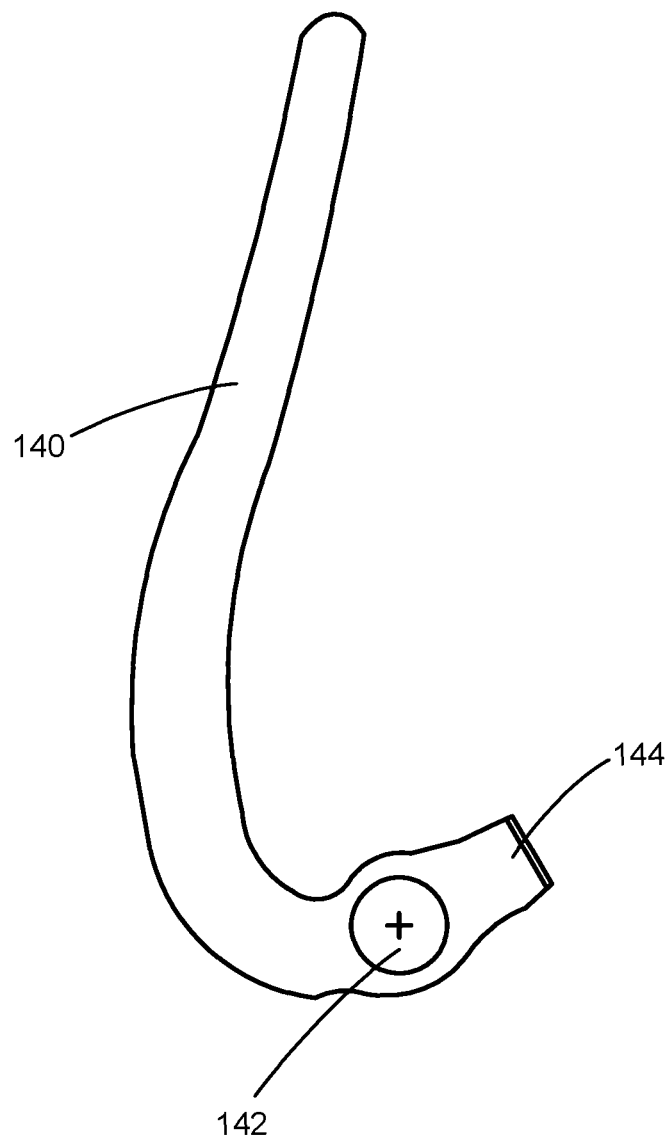
Figure 3E:
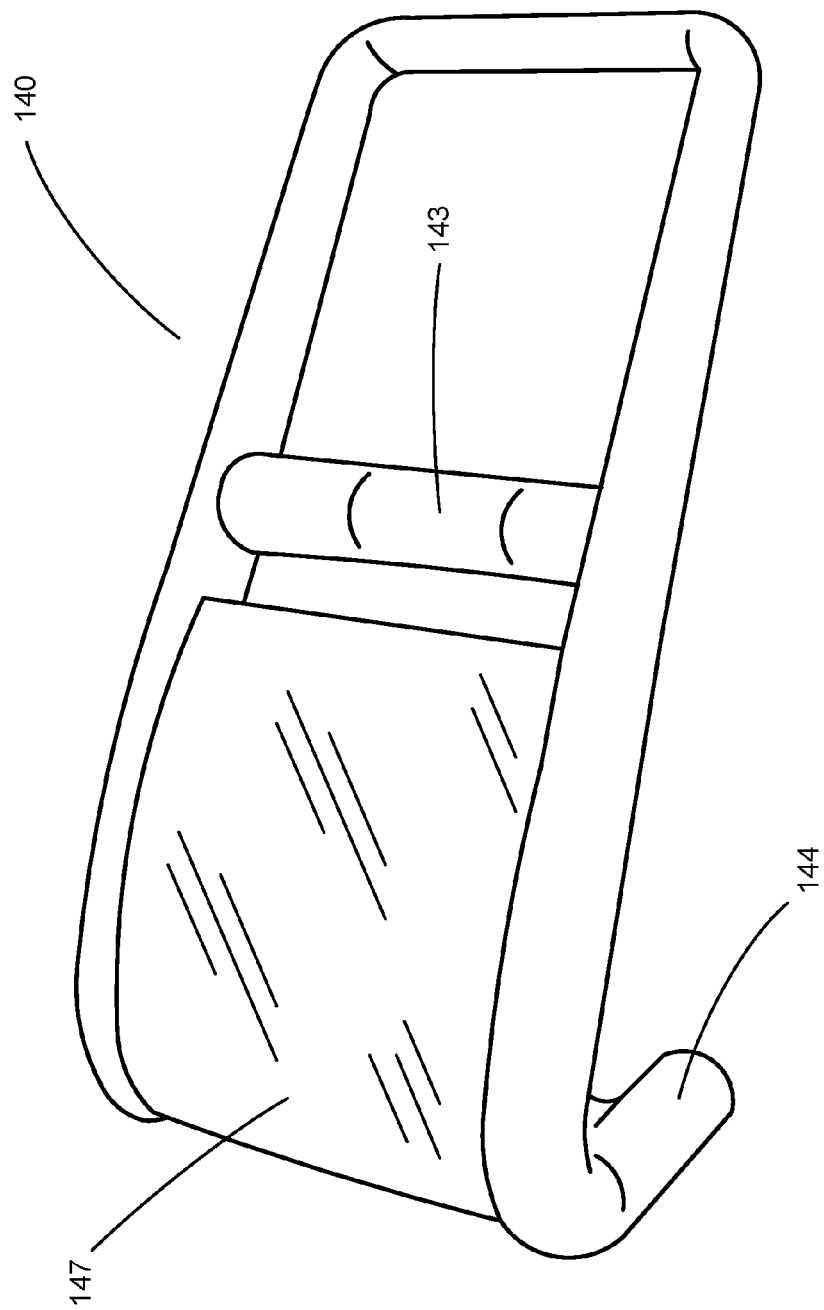
FIG. 3E illustrates a perspective view of a lower release ring of a ring release system having a central plate in accordance with various exemplary embodiments.
Figure 3F:
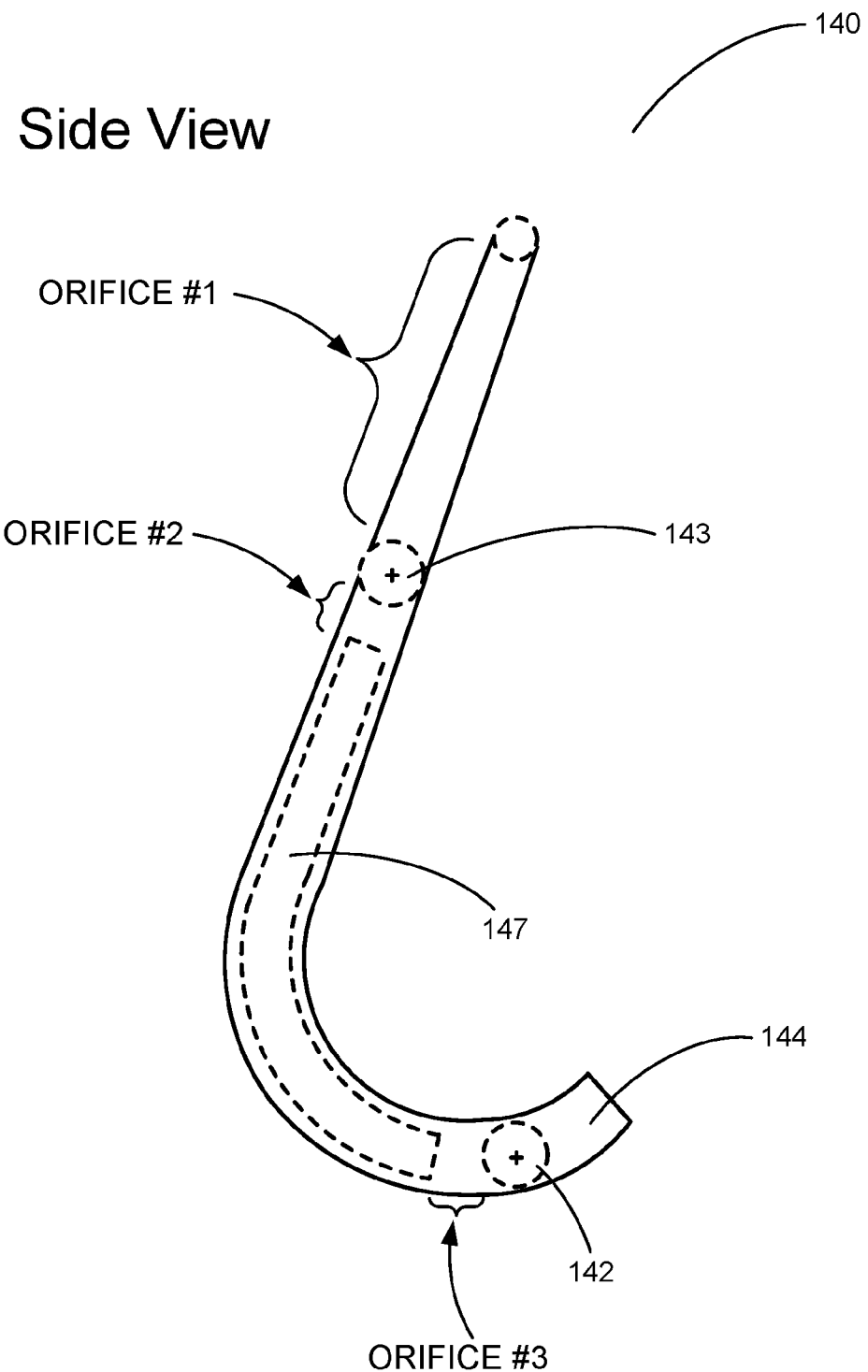
FIG. 3F illustrates a side view of a lower release ring of a ring release system having a central plate in accordance with various exemplary embodiments.

Ring extensions 144 may be configured with any suitable shape. For example, ring extensions 144 may be cylindrical, conical, spherical, looped, tapered, and/or arced. Ring extensions 144 may extend generally "in-line" (i.e, in-line with or generally parallel to the length of lower release ring 140, for example, as seen in FIG. 3A), or generally "outward" (i.e., perpendicular/sideways with respect to the length of lower release ring 140, for example, as seen in the left side of FIG. 3B). Moreover, ring extensions 144 may extend both "in-line" and "outward", for example as seen on the right side of FIG. 3B. A ring extension 144 on one side of lower release ring 140 may be configured similarly to a ring extension 144 on another side of lower release ring 140; alternatively, ring extensions 144 on a particular lower release ring 140 may differ from one another. In various exemplary embodiments, ring extensions 144 are configured to extend a distance between about 25% of the diameter of lower pivot pin 142 and about 200% of the diameter of lower pivot pin 142 past the pivot point of lower release ring 140.

Lower release ring 140 may be monolithic, for example a single cast, forged, and/or machined piece of metal. Alternatively, lower release ring 140 may comprise multiple components coupled together. For example, turning now to FIG. 3D, in various exemplary embodiments lower release ring 140 is configured with a hole therethrough, and lower pivot pin 142 (for example, a pin, a bolt, etc.) may be routed through the hole and affixed. In various exemplary embodiments, any suitable number of holes may be provided in lower release ring 140, and any suitable number of bolts or pins, for example upper pivot pin 143 or lateral stiffener 146, may be routed therethrough.

In various exemplary embodiments, lower release ring 140 may be configured with a reduced (and/or eliminated) curvature on at least one end thereof, similar to intermediate release ring 130. In this manner, lower release ring 140 may provide a longer lever arm and thus increased mechanical advantage as compared to prior release systems.

In various exemplary embodiments, in ring release system 100 upper release ring 120 is secured in the latched position via locking loop 112 and loop hold-down 114, and can be released by a pin pulling component or by a cutting component (for example, releasing pin 113). For use in cargo parachute systems, either of the foregoing releasing components are suitable. Moreover, any suitable release mechanism may be utilized, including electrical, explosive, and/or remotely-triggerable release components.

Because it is desirable to position the top of an upper release ring close to the riser webbing, in prior ring release systems a hole is universally cut through the riser webbing so the flexible locking/releasing loop can route through the riser to pull the top of the ring close to the webbing; this approach forces the release triggering means to be positioned on the side of the riser webbing that is opposite the rings. Typically, riser webbing is about 1.75" wide and the hole that is cut through the webbing is typically about 0.5" in diameter. In these prior ring-release systems, the hole-cutting process severs approximately 28.6% of the load carrying fibers of the webbing and, therefore, decreases the strength of the webbing by the same approximate amount.

In contrast, in various exemplary embodiments ring release system 100 provides a guide for locking loop 112 that allows it to properly control upper release ring 120 but does not require that a hole be cut through the webbing of riser assembly 110. This configuration of ring release system 100 preserves the full strength of the webbing comprising riser assembly 110. Additionally, this configuration allows the release triggering components of ring release system 100 to be located on the same side of riser assembly 110 as the various release rings. This feature can be beneficial for both the rigging and the rigging inspection processes. For example, after ring release system 100 is rigged (i.e., prepared for airdrop by connecting components in their logical order and tying them in place with cords that will sequentially fail during deployment) various persons will typically conduct inspections of the system, including aircrew members that are not likely to be parachute riggers. If both sides of the riser assembly 110 had to be inspected, as would be required if the rings were on one side of the webbing and the triggering means was on the opposite, this portion of ring release system 100 could not be optimally secured with sequential break ties. Therefore, ring release system 100 provides for individual components to be easily inspected without having to choose between either providing insufficient break ties or extensive pulling and twisting by inspectors. In this manner, ring release system 100 enables quicker inspection and validation as compared to prior ring release systems while also minimizing the potential to damage the rigging.

Figure 6:
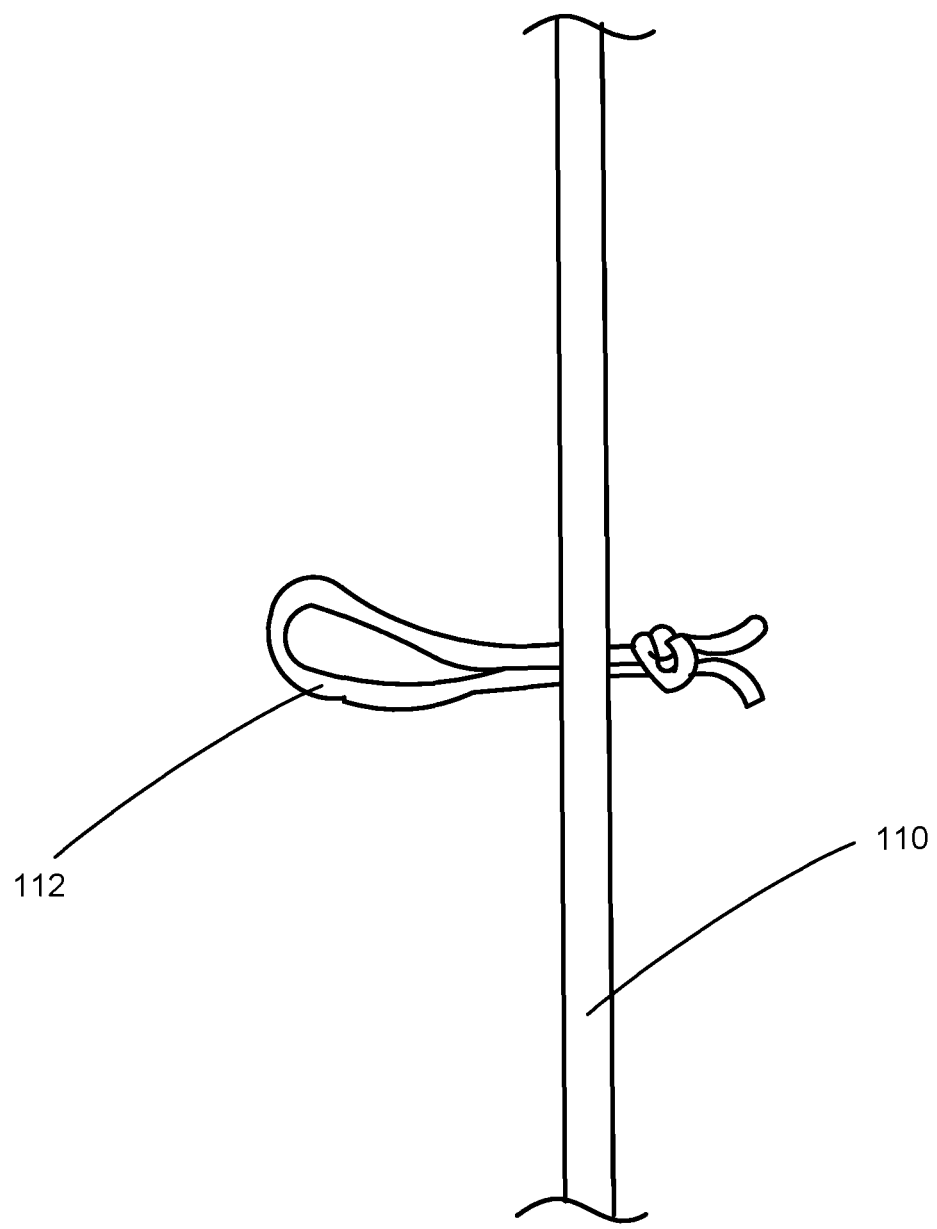
FIG. 6 illustrates a release component of a ring release system coupled to a riser assembly in accordance with an exemplary embodiment.

In various exemplary embodiments, with reference now to FIG. 6, in use of ring release system 100, locking loop 112 is routed through riser assembly 110 webbing (it will be appreciated that no hole is cut in the webbing comprising riser assembly 110, although an awl or other suitable tool may be utilized to temporarily separate the webbing weave) and is secured in position by friction and a knot tied in the tail ends of locking loop 112. This configuration provides two novel advantages compared to prior release systems: (i) a damaged locking loop 112 can easily be replaced without the need to disassemble and re-sew any portion of riser assembly 110; and (ii) the length of locking loop 112 can easily be altered to accommodate various release triggering devices, for example pin pullers, pyrotechnic cord cutters, and/or the like.

In some prior release systems, for example systems utilized in connection with loads of approximately 2000 pounds or less, loops of textile cord or webbing are used in lieu of rings for cargo releasing devices. However, each loop in a series can only halve the force that is applied to it, thereby making flexible loops much less mechanically advantageous than rings that act as levers. However, a flexible loop can be much more conveniently routed through the attachment provisions of various cargo package configurations than can any type of rigid ring.

In accordance with principles of the present disclosure, ring release system 100 is configured to enable this convenience feature while preserving the functional and/or mechanical advantages associated with the use of ring-style levers. With reference again to FIGS. 1A and 1B, ring release system 100 may comprise a flexible extension 150. Flexible extension 150 is configured with a loop 152 at the end therof. Flexible extension 150 is coupled to and extends downward from riser assembly 110. Flexible extension 150 typically comprises webbing, rope, or other strong and flexible material or materials. In some embodiments, flexible extension 150 may be covered or impregnated with a material having a low friction coefficient, such as polytetraflouroethlyne (PTFE, sold commercially under the Teflon® brand), or ultra-high molecular weight polyethylene (UHMWPE, sold commercially under the Spectra® brand) in order to reduce friction-induced textile to textile wear and abrasion.

In connection with use of ring release system 100, flexible extension 150 may be routed through an attachment means on an associated cargo package (for example, a ring, a textile loop, and/or the like), followed by being routed upward and releasably anchored to lower release ring 140. Responsive to rotation of lower release ring 140, loop 152 slides off lower release ring 140, separating the cargo package from riser assembly 110. It will be appreciated that this configuration provides at least two distinct advantages over prior ring release systems: (i) it allows ring release system 100 to be conveniently interfaced with various types of releasable cargo packages; and (ii) it halves the force that the release rings in ring release system 100 are exposed to during operation. Thus, depending on application, ring release system 100 may be utilized with heavier payloads without needing to be increased in size; alternatively, ring release system 100 may be made smaller while still being sufficiently strong to handle a particular payload.

Moreover, if the suspended mass supported by ring release system 100 is relatively light, flexible extension 150 may not be needed, and the attachment provisions of the payload can be connected directly to lower release ring 140. Additionally, it will be appreciated that there is no requirement for the payload attachment components to be flexible loops. For example, typical base rings or devises, which are typically connected to flexible payload elements, can be connected directly to lower release ring 140 (or to optional flexible extension 150).

Turning now to FIG. 7A, in some exemplary embodiments, ring release system 100 is configured with an upper release ring 120, an intermediate release ring 130, and a lower release ring 140. However, other suitable numbers of and/or combinations of rings may be utilized, as desired. For example, with reference to FIGS. 7B and 7C, a ring release system 100 may comprise an upper release ring 120 and an intermediate release ring 130 (which functions as a lower release ring 140). Moreover, in some exemplary embodiments where the payload is sufficiently light and/or the lever arm of lower release ring 140 is sufficiently long, a ring release system 100 may comprise only one ring, lower release ring 140; in these exemplary embodiments, the top of lower release ring 140 may be held in place prior to rotation via locking loop 112. Stated another way, ring release system 100 may be configured with two rings coupled to riser assembly 110, or even one ring coupled to riser assembly 110, rather than three. Moreover, depending on the space available, and the weight of a payload, ring release system 100 may be configured with more than three rings of progressively larger/wider sizes (for example, five rings: a smallest upper release ring 120, three progressively larger/wider intermediate release rings 130, and a final, largest lower release ring 140). Ring release system 100 may comprise one ring up to about ten rings coupled to riser assembly 110, as needed.

Figure 8:
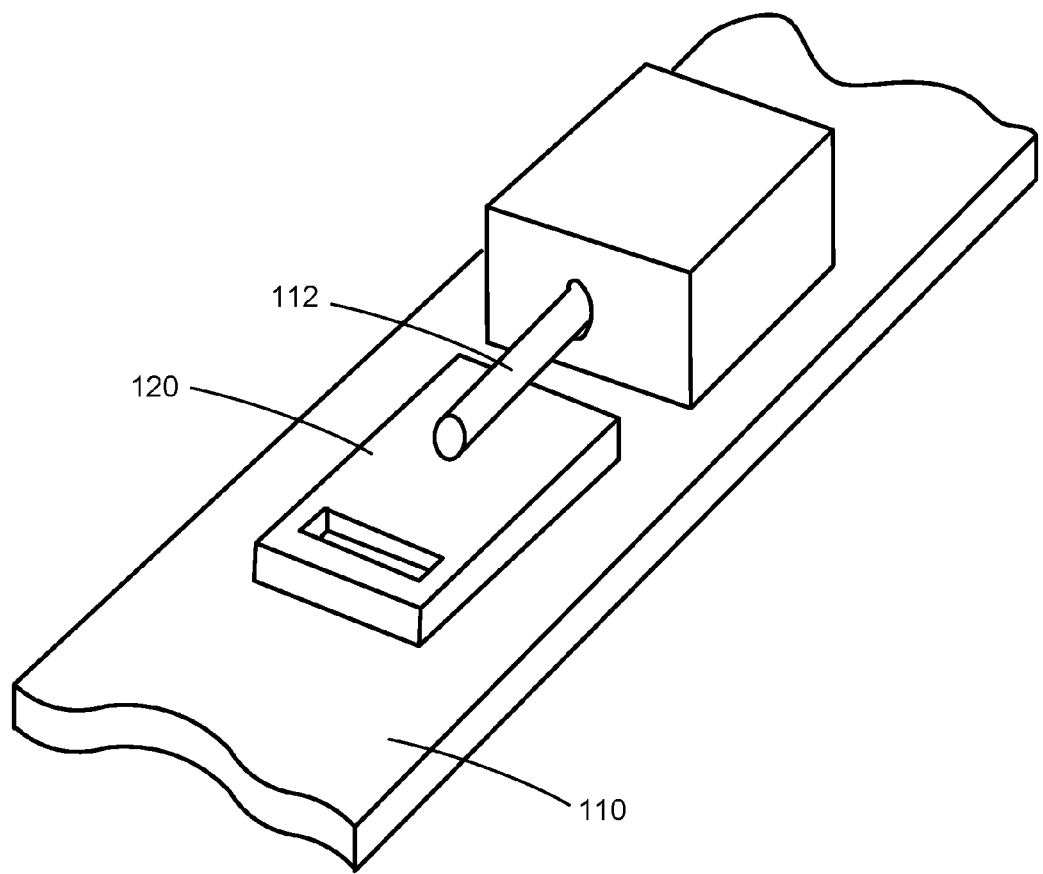
FIG. 8 illustrates release components for a ring release system having a rigid substrate in accordance with an exemplary embodiment.

With reference now to FIG. 8, in certain exemplary embodiments the upper release ring 120 need not be a typical ring at all. Rather, upper release "ring" 120 may be configured as a beam type lever, as illustrated in FIG. 8. Locking "loop" 112 may be a rigid bar that simply extends over upper release ring 120, be it a ring or a beam. Additionally, upper release ring 120 may be configured with a groove to keep releasing pin 113 centered therein. Alternatively, upper release ring 120 may be equipped with a recess that releasing pin 113 extends into. Moreover, releasing pin 113 need not be parallel with the longitudinal axis of ring release system 100. Releasing pin 113 may be perpendicular to the longitudinal axis, or at any angle between parallel and perpendicular.

Figure 12:
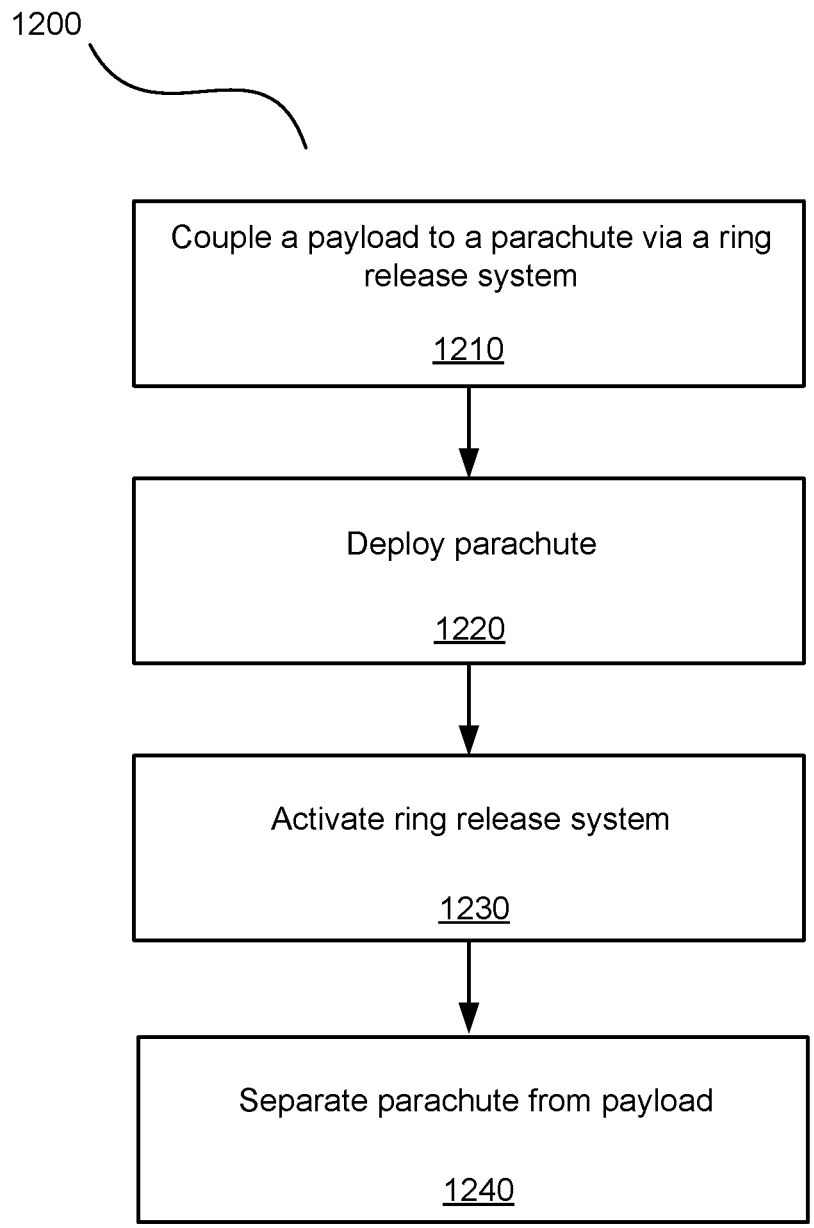
FIG. 12 illustrates a block diagram for a method of separating a parachute from a load in accordance with an exemplary embodiment.
Figure 13:
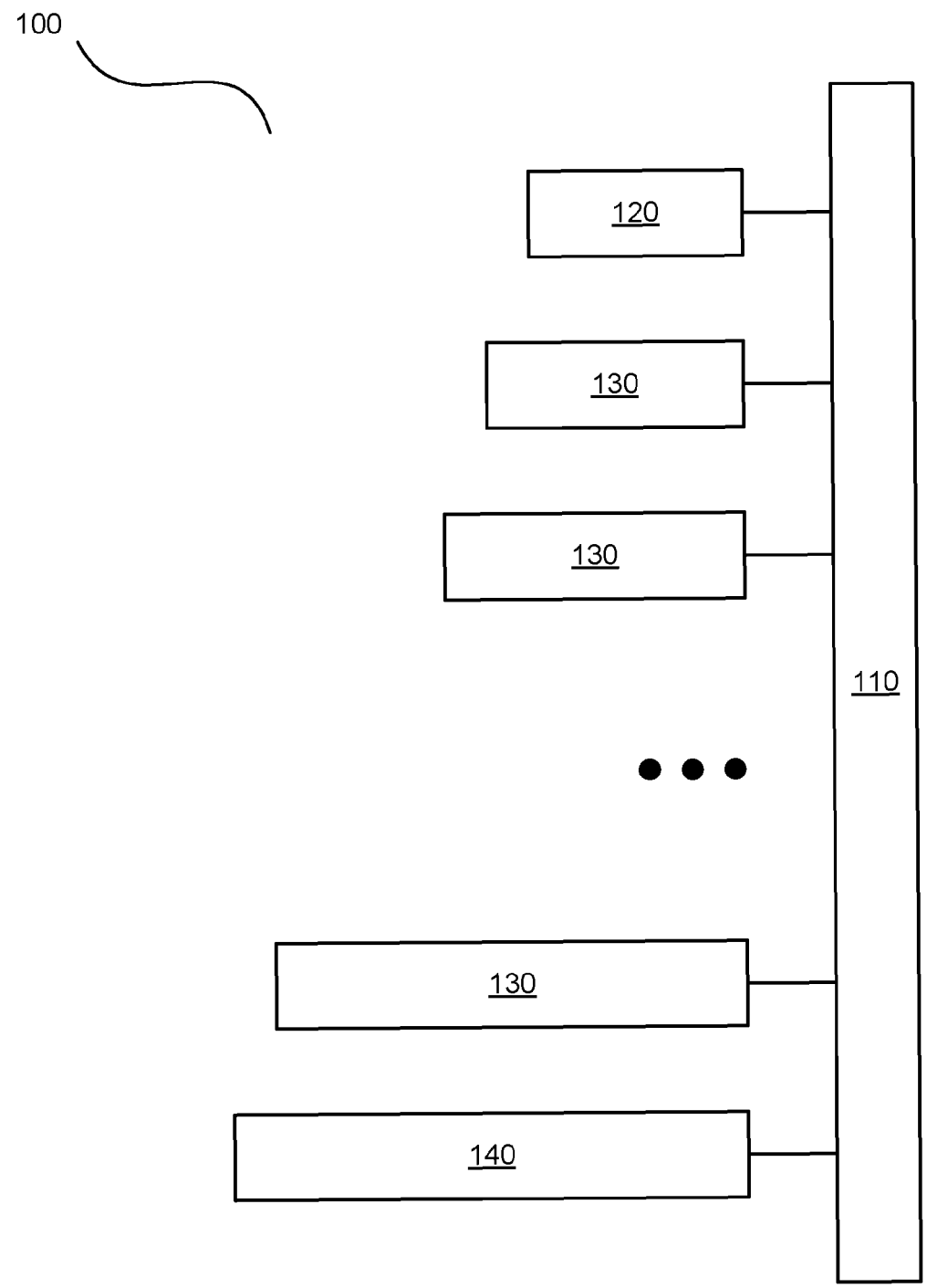
FIG. 13 illustrates a ring release system configured with a plurality of intermediate rings in accordance with an exemplary embodiment.

With reference now to FIG. 12, in various exemplary embodiments, in addition to being utilized to couple a payload to a parachute, a ring release system 100 (or components thereof, for example lower release ring 140) may be utilized to releasably secure a payload to an aerial delivery platform. Payloads are typically coupled to an aerial delivery platform with a relatively inelastic webbing (for example, made of polyester), which is known as a lashing, and an over-center cam type load binder. After the lashing length has been properly adjusted, when the load binder is closed, the lashing will be placed in tension. Typically, the load binder handle is tied in the closed position to prevent it from opening prematurely. When it is time to recover the payload from the aerial delivery platform, it is necessary to either release each of the load binders individually or, if it is important to recover the payload quickly (such as for a drive-away vehicle), the lashings are typically cut. However, there may be dozens of the lashings and it can be time consuming to cut all of them. Additionally, the potential exists to overlook some of the lashings during the initial cutting process, and the failure to cut all lashings may not be discovered until the drive-away is attempted. Damage to the vehicle or operator injury can result, and significant time can be wasted.

Figure 11:
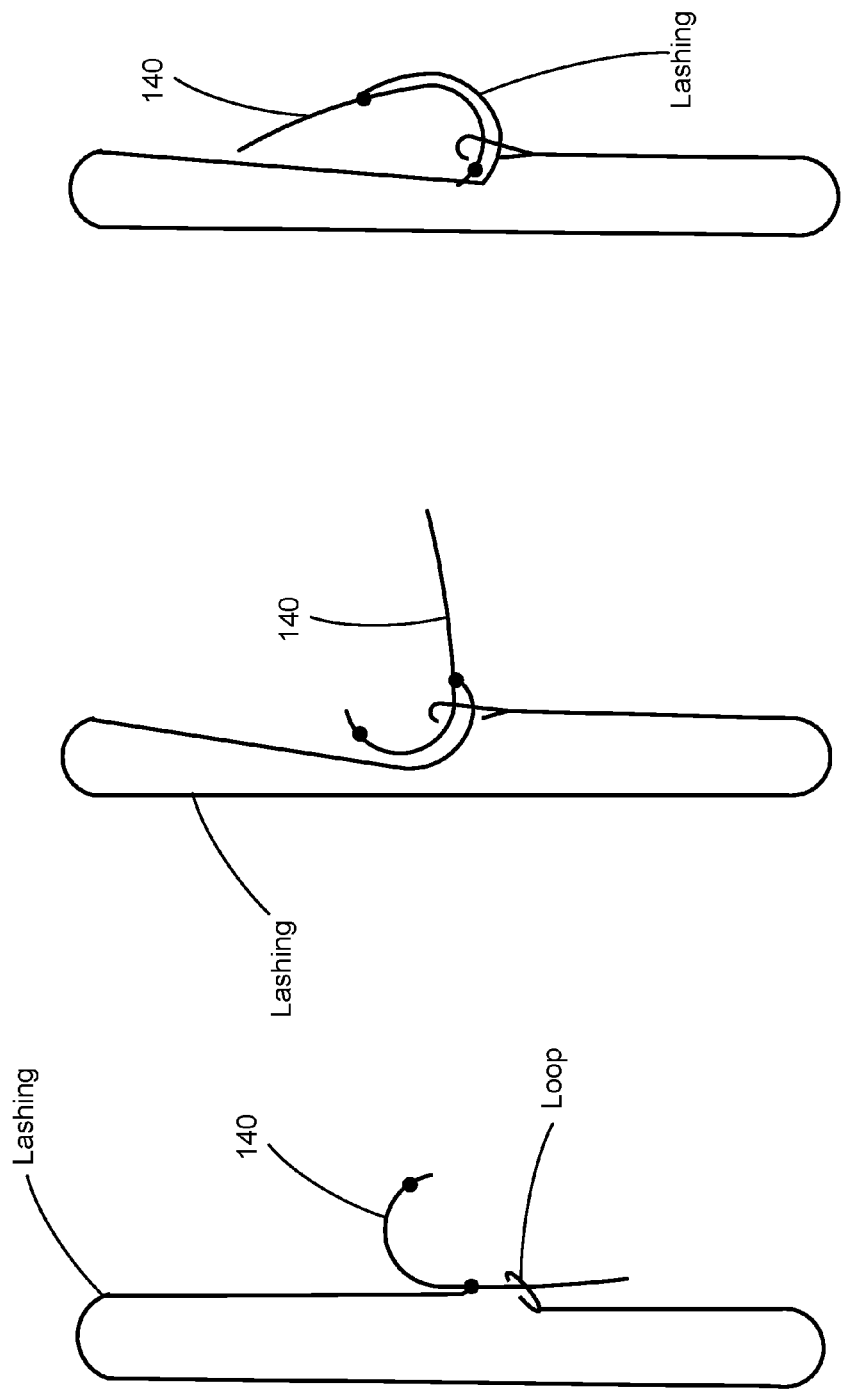
FIG. 11 illustrates operation of a "J"-shaped lower release ring operating with windlass-like functionality in a ring release system in accordance with an exemplary embodiment.

In contrast, this conventional process may be replicated with a process whereby each load binder is replaced with ring release system 100 utilizing a lower release ring 140. In these exemplary embodiments, lower release ring 140 is configured with multiple horizontal pins, bars, plates, or combinations thereof (i.e., one or more of element 142, 143, 146 and/or 147, shown as dots in FIG. 11). In these embodiments, lower release ring 140 is configured with one horizontal pin for the riser attachment (shown approximately in the middle of lower release ring 140 in FIG. 11) and one horizontal pin at the opposite end (shown near the bottom of the "J" shape of lower release ring 140 in FIG. 11) to provide a rounded contact surface. As illustrated in FIG. 11, one end of the lashing is coupled to the highest of the horizontal pins in lower release ring 140, and a loop at the other end of the lashing is passed around lower release ring 140. Responsive to rotation of lower release ring 140 into a secured position, tension is applied to the lashing. When it is desired to release the payload from the aerial delivery system, by pulling a handle attached to multiple cables (each cable coupled to a releasing pin 113), all lashings would be released simultaneously, none would be missed, and none would have to be cut.

Turning now to FIG. 12, in various exemplary embodiments ring release system 100 may be utilized in an exemplary method 1200 to separate a parachute from a payload. Ring release system 100 is coupled to a parachute and to a payload (step 1210). The payload (for example, a cargo pallet, a parachutist, and/or the like) is released into the air, for example from an aircraft. The parachute is deployed to slow and/or stabilize the descent of the payload (step 1220). When needed (for example, responsive to a partial or complete failure of the parachute, or at a desirable time to release a drogue parachute, or after the payload has reached the ground, etc.), ring release system 100 is activated, for example by pulling a release pin (step 1230). The release rings of ring release system 100 cascade open, freeing the payload from the parachute (step 1240).

It will be appreciated that ring release system 100 may also be utilized after a payload has landed on the ground, for example to separate multiple parachutes from a payload. When multiple parachutes are utilized for one payload, they are typically equipped with a mechanism that will release them from the payload after landing to prevent the payload from being dragged by winds and an inflated parachute. If the parachutes are not released individually, however, one of them might stay inflated, which will then drag any others across the terrain. In such a dragging process, it has been demonstrated many times that all the parachutes involved will be significantly damaged. To avoid the payload dragging potential, and to decouple one parachute from another, in prior approaches a landing sensor within a parachute releasing device will cause the parachutes to be released individually. However, in these prior approaches the apex of the payload slings remain attached to the main body of the parachute release device (where the landing sensor device is housed), and may at least partially trap the payload within the slings; it will be appreciated that this can be undesirable, particularly if the payload is a vehicle and the goal is to drive it away quickly after the parachute landing.

In contrast, in various exemplary embodiments each parachute may be secured to payload slings via a ring release system 100 (alternatively, multiple parachutes may be secured to payload slings via a ring release system 100). Responsive to operation of ring release system 100, flexible extension 150 separates from each payload sling, and no coupling between payload slings remains. Thus, drive-away of the payload is made more convenient.

While various exemplary embodiments have been discussed herein in connection with parachutes and payloads, it will be appreciated that principles of the present disclosure are more broadly applicable. For example, ring release system 100 may be used in any circumstance where two or more objects need to be releasably connected; additionally, the releasing means can require relatively low energy due to the mechanical advantage provided by ring release system 100. For an example, a relatively massive boat may be moored to a dock via ring release system 100 and a pin pulling lanyard could extend back to the boat. Responsive to a pull on the lanyard, the mooring line would be released from the dock, thus obviating the requirement to have a dock-based means to perform the releasing function.

While the principles of this disclosure have been shown in various embodiments, many modifications of structure, arrangements, proportions, the elements, materials and components, used in practice, which are particularly adapted for a specific environment and operating requirements may be used without departing from the principles and scope of this disclosure. These and other changes or modifications are intended to be included within the scope of the present disclosure and may be expressed in the following claims.

In the foregoing specification, various embodiments have been described. However, one of ordinary skill in the art appreciates that various modifications and changes can be made without departing from the scope of the present disclosure as set forth in the claims below. Accordingly, the specification is to be regarded in an illustrative rather than a restrictive sense, and all such modifications are intended to be included within the scope of the present disclosure. Likewise, benefits, other advantages, and solutions to problems have been described above with regard to various embodiments. However, benefits, advantages, solutions to problems, and any element(s) that may cause any benefit, advantage, or solution to occur or become more pronounced are not to be construed as a critical, required, or essential feature or element of any or all the claims. As used herein, the terms "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus. Also, as used herein, the terms "coupled," "coupling," or any other variation thereof, are intended to cover a physical connection, an electrical connection, a magnetic connection, an optical connection, a communicative connection, a functional connection, and/or any other connection. When language similar to "at least one of A, B, or C" is used in the claims, the phrase is intended to mean any of the following: (1) at least one of A; (2) at least one of B; (3) at least one of C; (4) at least one of A and at least one of B; (5) at least one of B and at least one of C; (6) at least one of A and at least one of C; or (7) at least one of A, at least one of B, and at least one of C.

What is claimed is:

1. A ring release system, comprising:
   a riser comprising webbing, the riser having a top and a bottom;
   a first release ring coupled to the riser via a cord, the cord passing through the weave of the webbing comprising the riser and stitched to the webbing on the side of the webbing opposite the first release ring; and
   a second release ring coupled to the riser.

2. The ring release system of claim 1, further comprising a retaining mechanism releasably coupled to the first release ring, wherein the first release ring and second release ring are cascadingly rotatable with respect to the riser responsive to release of the retaining mechanism.

3. The ring release system of claim 1, wherein the first release ring is configured with a plurality of holes, and wherein the first release ring is coupled to the riser via a plurality of cords.

4. The ring release system of claim 1, wherein the first release ring is configured with a lateral hole traversing the first release ring in a direction sideways to the top-to-bottom direction of the riser, and the cord passes through the lateral hole.

5. The ring release system of claim 1, wherein the first release ring comprises a plurality of holes disposed perpendicular to the face of the first release ring, wherein the first release ring is coupled to the riser via a plurality of cords, and wherein each one of the plurality of cords passes through a corresponding one of the plurality of holes.

6. The ring release system of claim 1, wherein the lower release ring is configured with a J-shape when viewed in a direction sideways to the top-to-bottom direction of the riser.

7. The ring release system of claim 1, wherein the riser comprises a first layer of webbing and a second layer of webbing, wherein the cord passes through the weave of the webbing comprising the first layer, and wherein a portion of the cord is disposed between the first layer and the second layer when stitched to the webbing.

8. The ring release system of claim 1, wherein the second release ring comprises:
   a metallic body having a first, upper end and a second, lower end;
   at least one lateral stiffener traversing the metallic body in a sideways direction; and
   a pair of extensions extending from the lower end of the metallic body.

9. The ring release system of claim 8, wherein each extension extends from the lower end in a direction parallel to the upper-to-lower direction of the second release ring.

10. The ring release system of claim 8, wherein each extension extends from the lower end in a direction perpendicular to the upper-to-lower direction of the second release ring.

11. The ring release system of claim 8, wherein each extension extends from the lower end in a direction neither parallel nor perpendicular to the upper-to-lower direction of the second release ring.

12. The ring release system of claim 8, wherein the pair of extensions are cylindrical.

13. The ring release system of claim 8, wherein the metallic body, the lateral stiffener, and the pair of extensions are monolithic.

14. The ring release system of claim 8, wherein the second release ring is nonplanar.

15. The ring release system of claim 8, wherein the second release ring further comprises a pivot pin traversing the metallic body in a sideways direction, wherein each extension extends from the lower end of the second release ring a distance at least 25% of the diameter of the pivot pin.

16. The ring release system of claim 8, wherein the second release ring has a maximum width, and wherein the upper end of the second release ring is configured as an arc having a radius greater than 50% of the maximum width of the second release ring.

17. The ring release system of claim 8, wherein the upper end of the second release ring is configured as a straight line.

18. The ring release system of claim 8, wherein the second release ring further comprises a central plate to resist compression forces.

* * * * *